United States Patent
Altberg et al.

(10) Patent No.: US 10,210,531 B2
(45) Date of Patent: *Feb. 19, 2019

(54) SYSTEMS AND METHODS TO FACILITATE THE SPECIFICATION OF A COMPLEX GEOGRAPHIC AREA

(75) Inventors: Ebbe Altberg, Mill Valley, CA (US); Scott Faber, San Francisco, CA (US); Ron Hirson, San Francisco, CA (US); Paul G. Manca, Oakland, CA (US); Sean Van Der Linden, Berkeley, CA (US); Jennifer R Zagofsky, San Francisco, CA (US)

(73) Assignee: YELLOWPAGES.COM LLC, D/FW Airport, TX (US)

(*) Notice: Subject to any disclaimer, the term of this patent is extended or adjusted under 35 U.S.C. 154(b) by 1753 days.

This patent is subject to a terminal disclaimer.

(21) Appl. No.: 11/862,111

(22) Filed: Sep. 26, 2007

(65) Prior Publication Data

US 2008/0313039 A1  Dec. 18, 2008

Related U.S. Application Data

(60) Provisional application No. 60/944,757, filed on Jun. 18, 2007.

(51) Int. Cl.
*G06Q 30/00* (2012.01)
*G06Q 30/02* (2012.01)
*G06Q 20/10* (2012.01)

(52) U.S. Cl.
CPC .......... *G06Q 30/02* (2013.01); *G06Q 20/10* (2013.01); *G06Q 30/0205* (2013.01);
(Continued)

(58) Field of Classification Search
CPC .......... G06Q 30/0273; G06Q 30/0205; G06Q 30/0251; G06Q 30/0257; G06Q 30/0261; G06Q 30/0256; G06Q 30/0259
(Continued)

(56) References Cited

U.S. PATENT DOCUMENTS

| | | |
|---|---|---|
| 4,653,090 A | 3/1987 | Hayden |
| 5,058,152 A | 10/1991 | Solomon et al. |
| (Continued) | | |

FOREIGN PATENT DOCUMENTS

| | | |
|---|---|---|
| WO | 2002088880 | 11/2002 |

OTHER PUBLICATIONS

EP Application No. 05745704.6, Examination Report, dated Feb. 1, 2010.
(Continued)

*Primary Examiner* — Raquel Alvarez
(74) *Attorney, Agent, or Firm* — Mark E. Stallion; Greensfelder Hemker & Gale PC

(57) ABSTRACT

Methods and systems to specify complex geographic areas for advertisements to connect advertisers and customers for real time communications. One embodiment includes: a web server to present a user interface to receive input specifying a plurality of geographic areas and one or more operations to combine the plurality of geographic areas into a geographic area of service of an advertisement and to provide the advertisement with a reference of a connection server for presentation to a customer when a location of the customer matches with the geographic area of service of the advertisement; and a connection server to receive a request from the customer for a connection to an advertiser of the advertisement and to provide the connection for real time communications between the customer and the advertiser in response to the request made via the reference of the connection server.

17 Claims, 17 Drawing Sheets

(52) U.S. Cl.
CPC ..... *G06Q 30/0251* (2013.01); *G06Q 30/0256* (2013.01); *G06Q 30/0257* (2013.01); *G06Q 30/0259* (2013.01); *G06Q 30/0261* (2013.01); *G06Q 30/0273* (2013.01); *G06Q 30/0277* (2013.01)

(58) Field of Classification Search
USPC ......... 705/14.69, 14.49, 14.55, 14.58, 14.57, 705/14.54
See application file for complete search history.

(56) References Cited

U.S. PATENT DOCUMENTS

| | | | |
|---|---|---|---|
| 5,533,107 | A | 7/1996 | Irwin et al. |
| 5,903,635 | A | 5/1999 | Kaplan |
| 6,385,583 | B1 | 5/2002 | Ladd et al. |
| 6,418,214 | B1 | 7/2002 | Smythe et al. |
| 7,428,497 | B2 | 9/2008 | Agarwal et al. |
| 7,876,886 | B2 | 1/2011 | Altberg |
| 8,027,878 | B2 | 9/2011 | Wong et al. |
| 8,209,225 | B2 | 6/2012 | Altberg et al. |
| 2002/0059591 | A1* | 5/2002 | Nakagawa ......... G06Q 30/0269 725/36 |
| 2002/0077987 | A1* | 6/2002 | Hasegawa ............ G06Q 30/02 705/52 |
| 2002/0116256 | A1 | 8/2002 | De Rafael et al. |
| 2002/0143631 | A1* | 10/2002 | Hasegawa ............ G06Q 30/02 705/14.69 |
| 2002/0161646 | A1 | 10/2002 | Gailey et al. |
| 2002/0191762 | A1 | 12/2002 | Benson |
| 2003/0220866 | A1* | 11/2003 | Pisaris-Henderson et al. ............. 705/37 |
| 2005/0114208 | A1 | 5/2005 | Arbuckle et al. |
| 2009/0060148 | A1 | 3/2009 | Jacob et al. |
| 2010/0036834 | A1* | 2/2010 | Bandas ........................ 707/5 |
| 2012/0130824 | A1* | 5/2012 | Pokonosky ............... 705/14.69 |

OTHER PUBLICATIONS

International Application No. PCT/US05/15631, Written Opinion and International Search Report, dated Feb. 22, 2007.
International Application No. PCT/US05/15646, Written Opinion and International Search Report, dated Jan. 29, 2007.
Meyers, Harriet, "Should Your Yellow Pages Ad Go Online?" Journal code: RNO, v141, No. 8, Aug. 1998, pp. 36-38

* cited by examiner

Create Ad — 161

? Help

Your ad is very important. Tell customers exactly what you're selling and why they should call you. Please review our Pay Per Call Ad Guidelines to ensure your ad is accepted and gets new customers calling your business today.

Ad Location Info

Business Name: [ ] (Sorry, no phone numbers)

☐ Use my Account Information

Address 1: [ ]

Address 2: [ ] (Optional)

City: [ ]

State: [-Select State-▽]

Zip Code: [ ] – [ ]

Phone Number: ( [ ] ) [ ] – [ ]  Enter the number where you'd like to receive calls Fax: ( [ ] ) [ ] – [ ]

Ad Marketing Message

Millions of people online will see your ad. So, in line 1 write a strong headline explaining what you're selling. To get people calling your business, include a promotional offer in line 2. This encourages buyers to call you now! Please note: Line 1 and Line 2 must each a complete sentence. Tips for success
Examples of Promotional Offers:
  - Call today and get $5 off.
  - Free consultation – limited time.
  - Call now and save 10%.
You'll be able to include more information about your offer on the business profile page. Learn more Marketing Message Line 1: [ ] (35 characters)

Marketing Message Line 2: [ ] (35 characters)

Create Advertisement   _ ☐ ✕

Enter the information you want to appear on your advertisement

| | | 411 |
|---|---|---|
| Business Name: | Hamstead Realty | |
| Address: | 50 Lee Ave. | 413 |
| City, State, Country: | St. Louis, MO, USA | 415 |
| Zip: | 63117  -  ☐ | 417 |
| Phone: | ( 314 ) 972 - 2801 | 419 |
| Web Site URL: | www.hamsteadrealty.com | |
| Tag Line: | Find a home with us | 421 |
| Description: | Experienced agents to assist you. Free guides & market analysis. | 423, 425 |

403

Specify the geographic area in which you provide services or products

| | | 441 |
|---|---|---|
| Service Center: | ☐ zip | |
| | ☐ city | 443 |
| | ☐ state | 445 |
| | ☐ country | 447 |
| | ☑ my address   ☐ other | 449 |
| Service Radius: | 5  miles ▽ | 429 |
| Further conditions: | ▽ | 451 |

405

427

[ Cancel ] 431     [ Submit ] 433

SYSTEMS AND METHODS TO FACILITATE THE SPECIFICATION OF A COMPLEX GEOGRAPHIC AREA

CROSS-REFERENCE TO RELATED APPLICATIONS

The present application claims priority from Provisional U.S. Patent Application Ser. No. 60/944,757, filed Jun. 18, 2007, the disclosure of which is incorporated herein by reference.

The present application is related to copending U.S. patent application Ser. No. 11/095,853, filed Mar. 30, 2005 and entitled "Methods and apparatuses for geographic area selections in pay-per-call advertisement," which claims priority from Provisional U.S. Patent Application Ser. No. 60/653,661, filed Feb. 16, 2005.

TECHNOLOGY FIELD

At least some embodiments of the disclosure relate to user interfaces for geographic area specification in general and more particularly but not limited to connecting people for real time communications through matching at least geographic areas/locations.

BACKGROUND

People can use telephone systems to conduct real time two-way voice communications without having to be at the same physical location. Traditional land-line based telephone systems connect one telephone set to another through one or more switching centers, operated by one or more telephone companies, over a land-line based telephone network which was typically a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form of discrete packets rather than in the traditional circuit-committed protocols of the public switched telephone network (PSTN).

Cellular communication networks allow a cellular phone to connect to a nearby cellular base station through an air interface for wireless access to a telephone network. Recent developments in wireless telephone systems allow not only voice communications but also data communications. For example, cellular phones can now receive and send messages through a Short Message Service (SMS), a Multimedia Message Service (MMS), or data communication connections. For example, web pages can be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone systems are frequently used in conducting business. Telephone numbers are typically provided in advertisements, web sites, directories, etc., as a type of contact information to reach businesses, experts, persons, etc.

The Internet provides another communication media that can also be used as an advertisement media to reach globally populated web users. For example, advertisements can be included in a web page that is frequently visited by web users. Typically, advertisements included in web pages contain only a limited amount of information (e.g., a small paragraph, an icon, etc.); and links in the advertisements are used to direct the visitors to the web sites of the advertisers for further detailed information. For certain arrangements, the advertisers pay for the advertisements based on the number of visits directed to their web sites by the links in the advertisements, or based on the number of presentations of the advertisements.

Performance based advertising generally refers to a type of advertising in which an advertiser pays only for a measurable event that is a direct result of an advertisement being viewed by a consumer. For example, in one form of performance-based search advertising, an advertisement is included within a result page of a keyword search. Each selection ("click") of the advertisement from the results page is the measurable event for which the advertiser pays. In other words, payment by the advertiser is on a per click basis in such advertising.

SUMMARY OF THE DESCRIPTION

Methods and systems to specify complex geographic areas for advertisements to connect advertisers and customers for real time communications are described herein. Some embodiments are summarized in this section.

One embodiment includes: a web server to present a user interface to receive input specifying a plurality of geographic areas and one or more operations to combine the plurality of geographic areas into a geographic area of service of an advertisement and to provide the advertisement with a reference of a connection server for presentation to a customer when a location of the customer matches with the geographic area of service of the advertisement; and a connection server to receive a request from the customer for a connection to an advertiser of the advertisement and to provide the connection for real time communications between the customer and the advertiser in response to the request made via the reference of the connection server.

One embodiment includes: presenting a user interface to receive input specifying a plurality of geographic areas and one or more operations to combine the plurality of geographic areas into a geographic area of service of an advertisement; providing the advertisement with a reference of a connection server for presentation to a customer when a location of the customer matches with the geographic area of service of the advertisement; receiving at the connection server a request from the customer for a connection to an advertiser of the advertisement; and providing the connection for real time communications between the customer and the advertiser in response to the request made via the reference of the connection server.

The present disclosure includes methods and apparatuses which perform these methods, including data processing systems which perform these methods, and computer readable media which when executed on data processing systems cause the systems to perform these methods.

Other features will be apparent from the accompanying drawings and from the detailed description which follows.

BRIEF DESCRIPTION OF THE DRAWINGS

The disclosure is illustrated by way of example and not limitation in the figures of the accompanying drawings in which like references indicate similar elements.

FIG. 5 illustrates a user interface for the creation of an advertisement according to one embodiment.

FIG. 14 illustrates a user interface to manage an advertisement according to one embodiment.

DETAILED DESCRIPTION

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the disclosure, the term "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

In one embodiment, a user interface and method to specify a complex geographic area is provided. The user interface and method can be used to specify a service area of an advertisement, and/or to specify a search criterion for finding an advertiser who services a specific geographic area. In one embodiment, a plurality of partially overlapping geographic areas are combined to specify a complex geographic area.

In one embodiment, the advertisements are targeted to customers in specific geographic areas; and the advertisements are provided with communication references that can be used to request connections to the advertisers for real time communications, such as for telephonic conversations, instant messaging in text, voice and/or video, application sharing, screen sharing, common whiteboarding, etc. In one embodiment, the communication references are references of a connection server, which can be used to request the connection server to provide the connections to the advertisers based on the references used to make the requests.

Figure 1:
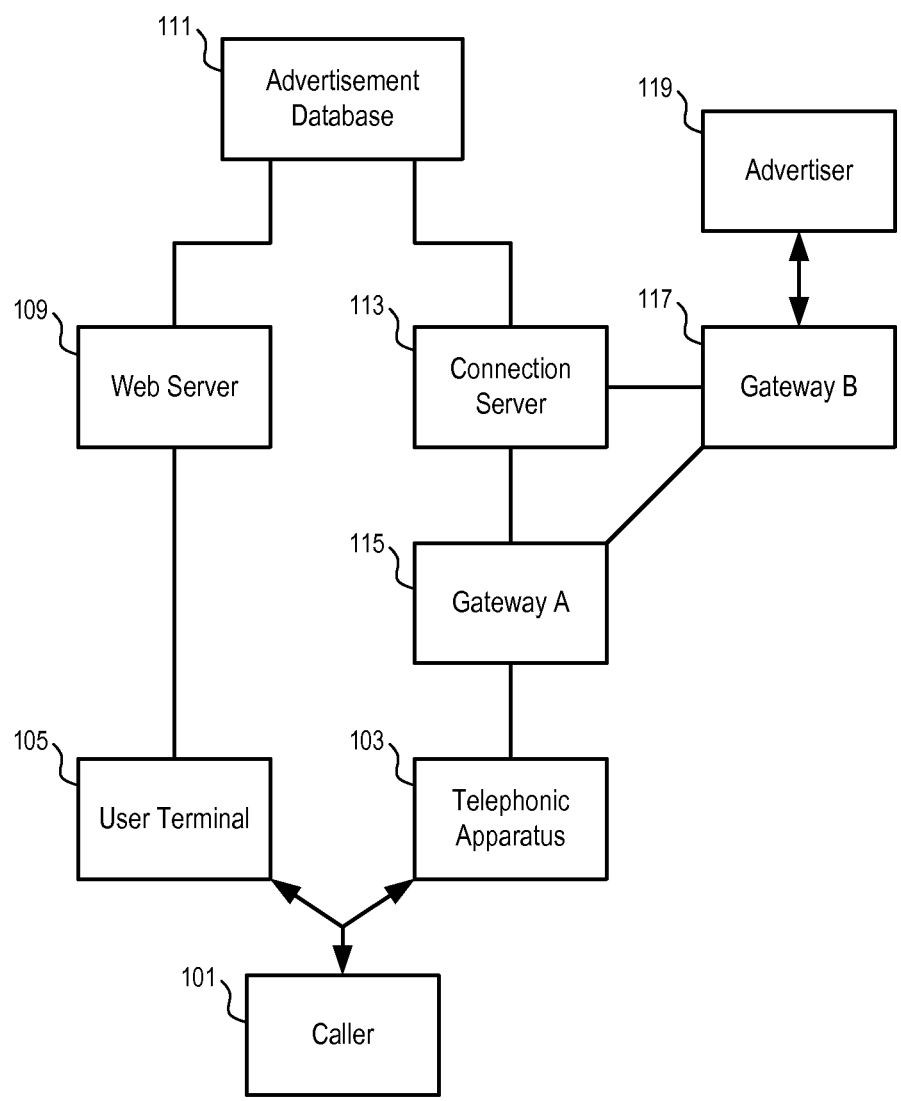
FIG. 1 illustrates a system to connect a caller to a callee via advertisements according to one embodiment.

FIG. 1 illustrates a system to connect a caller to a callee via advertisements according to one embodiment. In FIG. 1, a user terminal (105) that supports data communication is used to query for advertisements via a web server (109) of a connection provider which has an advertisement database (111) and a connection server (113). The user terminal (105) may query the web server (109) directly or indirectly. In one embodiment, a listing server (not shown in FIG. 1) or the web server (109) may selectively serve listings/advertisements obtained from different sources/databases.

In one embodiment, the advertiser (119) can specify a specific geographic area for the services provided by the advertiser (119). The caller (101) may indicate a geographic location when submitting the query. Alternatively, the web server (109) may determine an indication of the geographic location of the user terminal (105) based on the submitted query.

In one embodiment, when the caller (101) requests the connection server (113) to provide a connection to the advertiser (119) via the reference of the connection server (113), the connection server (113) determines whether the telephonic apparatus (103) is within the service area of the advertiser (119) before connecting the caller (101) to the advertiser (119). In one embodiment, if the location of the caller (101) is outside the service area of the advertiser (119), the connection server (113) provides alternative advertisers who provide services similar to those of the advertiser (119) and whose service areas cover the location of the caller (101).

In one embodiment, the advertisements retrieved from the web server (109) contain telephonic references, which can be used by the telephonic apparatus (103) to call the connection server (113). The connection server (113) identifies the telephone contact information of the corresponding advertisers based on the telephonic references called by the telephonic apparatus (103) and then further connects the call to the advertiser(s) (e.g., 119).

In one embodiment, the telephonic apparatus (103) is a softphone implemented at least in part via software, such as an instant messenger, a VoIP client application running on a computer, an applet embedded in a web page, a handheld device, a personal digital assistant (PDA), a cellular phone, a cordless phone, a Bluetooth phone, a WiFi phone, etc. In some embodiments, the telephonic apparatus (103) is implemented via hardwire circuitry, such Application-Specific Integrated Circuit (ASIC); in some embodiments, the telephonic apparatus (103) is implemented partially via special purpose hardwire circuitry and partially via software, such as Application-Specific Integrated Circuit (ASIC) or Field-Programmable Gate Array (FPGA) with software/firmware; and in some embodiments, the telephonic apparatus is implemented using a set of general purpose hardwire components that are under the control of software. In one embodiment, the telephonic apparatus (103) is a Plain Old Telephone Set (POTS).

In one embodiment, the user terminal (105) and the telephonic apparatus (103) are integrated in one device. Alternatively, the user terminal (105) and the telephonic apparatus (103) can be distinct and separate devices having different housings and may not be at the same location at the time the call is made.

In one embodiment, the telephonic references in the advertisements that are retrieved directly or indirectly via the web server (109) are SIP URIs which contain encrypted information, such as the telephone number of the advertiser, an identifier of the caller, information about the query, the service geographic area of the advertisement, and/or the position of the advertisement in the sorted list of the search result, etc. The connection server (113) decrypts the SIP URI that is used to call the connection server (113) to further connect the call to the advertiser.

In one embodiment, the query of the telephonic apparatus (103) is submitted to the web server (109) with an identifier of the caller, such as a telephone number of the caller, a user identifier of a telephonic apparatus, an internet address of the telephonic apparatus, a softphone user ID, a number unique to the softphone user ID among different softphone user IDs, etc. In one embodiment, the identifier of the caller is encrypted in the SIP URI. When the telephonic apparatus (103) calls the connection server (113) using the SIP URI, the connection server (113) can determine whether the call is made from the same apparatus or caller that submitted the query. For example, the connection provider may prevent other telephonic apparatuses or callers that did not perform the query from calling the advertiser (119) using the result of the query. The connection provider can also use the identifier information of the caller to determine whether a query is generated by a machine in an automated fashion and to determine whether the query and/or the calls from the caller should be blocked. For example, after an advertiser complains about a call from a caller, the connection server can block the queries and/or calls from the caller (e.g., for a period of time) to that advertiser, a subset of advertisers or all advertisers.

In one embodiment, the telephonic apparatus is capable of making a VoIP call but using a protocol different from the protocol used by the gateway (e.g., SIP); and a gateway (115) is used to interface the telephonic apparatus and the connection server (113). In another embodiment, the telephonic apparatus is capable of making a SIP call using the SIP URI to reach the connection server (113) without the gateway (115). In one embodiment, the telephonic apparatus makes a call over a Public Switch Telephone Network (PSTN); and a telecommunication carrier bridges the call from the PSTN to the connection provider on a data network.

In one embodiment, the advertiser (119) uses a telephone that is connected on the Public Switch Telephone Network (PSTN); and the connection server (113) uses the gateway (117) to reach advertiser (119). In one embodiment, the gateway (117) is operated by a telecommunication carrier of the connection provider. In one embodiment, the connection server (113) uses the gateways (115 and 117) to set up the call and direct the gateways (115 and 117) to make a direct media connection that does not go through the connection server (113) to provide the telephone connection between the caller (101) and the advertiser (119). In one embodiment, the advertiser (119) uses a telephone that is connected on a data network; and the gateway (117) is used to bridge the protocol used by the telephone of the advertiser (119) and the protocol used by the connection server (113). In another embodiment, the telephone of the advertiser (119) and the connection server (113) may use the same protocol; and the connection server (113) can call the telephone of the advertiser (119) directly (e.g., via SIP) without a gateway (117).

In one embodiment, the connection provider charges the caller on behalf of the advertiser for services provided by the advertiser over the telephone connection established via the advertisement. In one embodiment, the connection provider charges the advertiser an advertisement fee per connection made via the advertisement. The advertiser may place a bid price for the advertisement fee; and the bid price can be used in ranking the advertisements in the set of search results that match with the query. In one embodiment, the advertisements can be further ranked according to a distance to a location specified or indicated by the user, in addition to the bid price. In one embodiment, the bid price can be in the form of a maximum bid; and the actual bid is determined based on the bid price that is ranked next to the advertisement in the ranked search results. In one embodiment, the connection provider charges the caller on behalf of the advertiser for services provider by the advertiser over the telephone connection established via the advertisement; and the connection provider charges the advertiser the advertisement fee according to the bid price and a commission fee according to what the advertiser charges the caller.

In one embodiment, the connection provider charges the caller according to a price specified by the advertiser for services provided by the advertiser over the connection provided via the advertisement. The caller may be charged before being connected to the advertiser, or be connected to the advertiser for an initial free period of time until the advertiser request payments. The advertiser may request payments via the phone used by the advertiser (e.g., by pressing a key on a POTS telephone, a button on a softphone or a control panel accessed via a web server of the connection provider, etc.) In one embodiment, the price can be specified by the advertiser after the customer is connected to the advertiser.

In one embodiment, the connection provider can charge the callers and/or the advertisers from their credit card accounts, debit card accounts, member accounts, or telephone accounts, etc. For example, in one embodiment, the connection provider may charge the caller via the credits the caller purchased to use with an account for a softphone or an instant messaging service. For example, the connection provider may maintain a member account for the caller or advertiser which can be debited and be recharged from other payment sources, such as a bank account, a credit card account, etc. In one embodiment, the connection provider can identify the telephone accounts of the callers and/or the advertisers and bill or credit the callers/advertisers through their telephone bills. In one embodiment, the connection provider can bill the callers/advertisers through deducting the pre-purchased credits/minutes that are purchased from third party communication service providers, such as telephone companies, cellular phone carries, etc.

In on embodiment, the user terminal (105) obtains listings directly or indirectly via a web server (109) of the connection provider. Listings obtained from other sources may also be selectively presented with the advertisements obtained from the database (111) in response to a search request from the caller.

In one embodiment, the connection provider encrypts information related to the search, the advertiser's telephonic contact information, the caller's identification information, the ID of the listing server (105), etc. in the SIP URI which can be called by the telephonic apparatus (103) to reach the connection server (103). Alternatively, other types of telephonic references can be used, such as telephone numbers with extensions, VoIP user identifiers, etc. In one embodiment, the telephonic reference may be a link to the web server (109), which can be visited to cause the connection server (113) to callback the caller (101) at the telephonic apparatus (103).

The information can be encrypted/encoded in the telephonic references provided in the advertisements. Alternatively, the telephonic references can be used in a database to look up the associated information such as the advertiser's telephonic contact information, the keywords used in the search, caller's identification information, the ID of the distributor of the user terminal (105) or a ID of a partner whose web server caused the user terminal to visit the web server (109) for the search, promotions/electronic coupons provided with the advertisement, etc.

In one embodiment, the SIP URI provided in the advertisement via the web server (109) can be used to call the connection server (113) for a telephone connection to the advertiser (119). The SIP URI contains information in an encrypted string (e.g., sip:<Encrypted String>@sip.ingenio.com), such as information about the advertiser, information about the user who performed the query, information about the demand partner who distributes the hardware and/or the software of the telephone apparatus and/or who distributes the advertisements to the telephonic apparatus (103), and information about the query, such as a search term used in the query, the timestamp of the search, the order number of the advertisement in the result set, an identification of the advertisement, promotions/electronic coupons provided with the advertisement, etc. The telephone apparatus (103) is connected to the connection server (113) at the SIP "end point," before being further connected by the connection server (113) to the advertiser (119).

In one embodiment, the user terminal (105) is configured to have the capability to store or bookmark the SIP URI provided in the advertisement. For example, the SIP URI can be stored in association with the advertisement or advertiser in a contact book maintained on the user terminal (105).

In one embodiment, a gateway (115) is used to bridge the call from the telephone apparatus (103) that is in one VoIP domain (e.g., based on a proprietary protocol for VoIP) and the connection server (113) that is in another VoIP domain (e.g., based on an open standard VoIP protocol).

In one embodiment, the SIP URI is provided as a communication reference which can be used directly by the telephone apparatus (103) to call the gateway (115) which further connects the call to the connection server (113). For example, when the telephone apparatus is configured generally to initiate calls to traditional telephone numbers or VoIP user IDs (e.g., via a proprietary protocol), the telephone apparatus can be configured to treat the SIP URI as a VoIP user ID associated with the gateway. Alternatively, a portion of the SIP URI (e.g., the encrypted string) can be used as VoIP user ID to reach the gateway.

In another embodiment, the web server (109) provides the advertisement with a traditional telephone number instead of the SIP URI. The traditional telephone number may or may not include an extension. The telephone apparatus (103) uses the gateway (115) to access PSTN and reach the connection server (113) via a telecommunication carrier which bridges the call from the PSTN to the connection server (113). The telecommunication carrier may provide the call to the connection server (113) via a SIP call. In one embodiment, the extension is to be dialed by the telephonic apparatus after the telephonic connection between the telephonic apparatus (103) and the connection server (113) is established. In another embodiment, the extension is to be dialed by the gateway (115). In a further embodiment, the gateway (115) places a SIP call to the connection server (113), bypassing the telecommunication carrier of the connection provider; and the extension is used to construct the SIP URI of the call (or be included in the SIP INVITE message sent from the gateway (115)).

In embodiments, the gateway (115) used to bridge the call to the PSTN may prevent the connection server (113) from identifying the caller via ANI (Automatic Number Identification (ANI) service. To provide information to identify the caller, the gateway (115) can be further configured to provide the information about the caller to the connection provider via call ID information or via extension. Alternatively, the gateway (115) may bypass the telecommunication carrier and connect the call to the connection provider via a SIP call and provide the information about the caller in the FROM header of the SIP INVITE message.

In one embodiment, when a gateway (115) is used to bridge one protocol used by the telephone apparatus (e.g., a proprietary protocol) and another protocol used by the connection server (e.g., SIP), the telephone network is configured to route the call to the gateway that is nearest to the connection server to reduce the distance over the Internet between the gateway and the connection server. The telephonic apparatus (103) can use other gateways (not shown in FIG. 1) to reach other callees.

In one embodiment, the user terminal (105) is configured to identify a geographic area to the connection provider when submitting a query; and the connection provider can return advertisements/listings based on the geographic area and/or selectively block the calls from customers who are outside the service area of the advertisers. In one embodiment, the telephonic apparatus (103) is configured to identify a geographic area to the connection provider when initiating a call to the connection server (113); and the connection provider can selectively block the calls from customers who are outside the service area of the advertisers or provide opportunities to connect to alternative advertisers (e.g., through prompts provided and input received via a human operator or an Interactive Voice Response (IVR) system).

Figure 2:
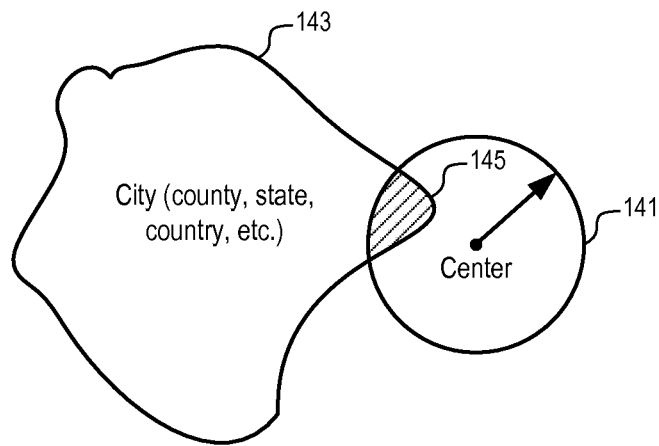
FIG. 2 illustrates a method to specify a complex geographic area according to one embodiment.

FIG. 2 illustrates a method to specify a complex geographic area according to one embodiment. In FIG. 2, a geographic area is specified as the common area (145) of two partially overlapping areas (143 and 141). In FIG. 2, the area (141) is specified via a center and a distance to the center; and the area (143) is specified via selecting one from a set of predefined areas (e.g., city, county, state, or country, etc.) The center of the area (141) can be a center of a predefined area, such as an area having the same postal code, a city, a metropolitan area, a county, a state or province, a country, a school district, a commercial district, an area having the same telephone area code, an area having the same telephone area code and exchange prefix, etc. Alternatively, the center of the area (141) can be specified by a street address, a set of coordinates, such as Global Positioning System (GPS) coordinates, or a pair of latitude and longitude, a point selected from a displayed map, etc.

In FIG. 2, the area (141) has a portion that is outside the common area (145); and the area (143) also has a portion that is outside the common area (145).

In FIG. 2, the area (143) is used to specify that a portion of the area (141) that is not in the area (143) is to be excluded from the resulting area; and the area (141) can be used to specify that a portion of the area (143) that is not in the area (141) is to be excluded from the resulting area.

Alternatively, the area (143) is used to specify that a portion of the area (141) that is in the area (143) is to be excluded from the resulting area; and thus, the resulting area is the portion of the area (141) that is outside the common area (145).

Alternatively, the area (141) can be used to specify that a portion of the area (143) that is in the area (141) is to be excluded from the resulting area; and thus, the resulting area is the portion of the area (143) that is outside the common area (145).

In one embodiment, more than two areas can be combined to specify a geographic area. For example, after two areas are combined into an intermediate resulting area, the intermediate resulting area can be further combined with a third area to specify a desired geographic area.

In one embodiment, the shape of the area (141) can be specified via selecting one from a plurality of pre-defined shapes, such as circle, square, triangle, rectangle, etc. In one embodiment, the pre-defined shapes may have more than one parameter for specifying the dimensions (e.g., width and height). In one embodiment, the pre-defined shapes may have parameters for specifying the orientation of the shapes. In one embodiment, an interactive graphical user interface is provided to select the shapes, dimensions and orientations. For example, the shape of the area can be defined using latitude and longitude, locations determined via a position determination system, such as a Global Positioning System (GPS), etc.

Figure 3:
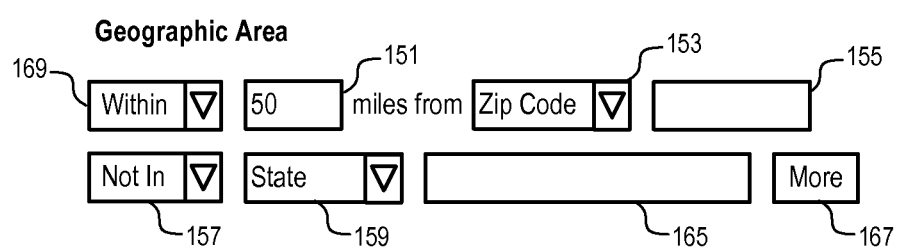
FIG. 3 illustrates a user interface for specifying a complex geographic area according to one embodiment.

FIG. 3 illustrates a user interface for specifying a complex geographic area according to one embodiment. In FIG. 3, the user interface includes an entry box (151) to specify a radius of a desired geographic area.

In FIG. 3, the selection box (153) can be used to select a type of center. For example, the center can be specified as a street address, the center of a zip code, a count, a state, a country, etc. The detailed information about the center can be specified in the entry box (155).

In FIG. 3, the selection box (169) can be used to specify whether the desired geographic area is within, or not in, the area specified by the center (153 and 155) and the distance (151). The first area specified by the center (153 and 155) and the distance (151) can be further modified via a second area specified by the selection boxes (157, 159) and the entry box (165). For example, the first area specified by the center (153 and 155) and the distance (151) can be further modified by excluding a portion that is in a state specified in the entry box (165), or by excluding a portion that is not in a state specified in the entry box (165). In one embodiment, the second area can also be specified based on a center and a distance.

In FIG. 3, the icon button (167) can be selected to request further user interface elements for the specification of a third geographic area that is to be used to modify the resulting area of the first two areas identified by the entry boxes (155 and 165). After the user interface element for the specification of the third geographic area is displayed, a similar button can be selected to request further user interface elements for a further geographic area. Thus, any numbers of geographic areas can be combined.

Thus, a combination of a plurality of areas, which can be easily specified via the entry boxes and selection boxes, can be used to specify a complex geographic area.

In one embodiment, the limitations about the resulting geographic area can be selectively tightened or relaxed. For example, during a search for a matching advertisement, if the radius of an area may be increased to find candidates for suggestions of possible matches. Alternatively, the radius of an area can be reduced to limit the service area of the advertisement. In one embodiment, the limitations specified based on the pre-determined areas (e.g., city, state, country, etc.) are not tightened or relaxed. Thus, the complex geographic area can be considered as a set of geographic area limitations, some of which are soft and may not be followed strictly in search for a match.

Figure 4:
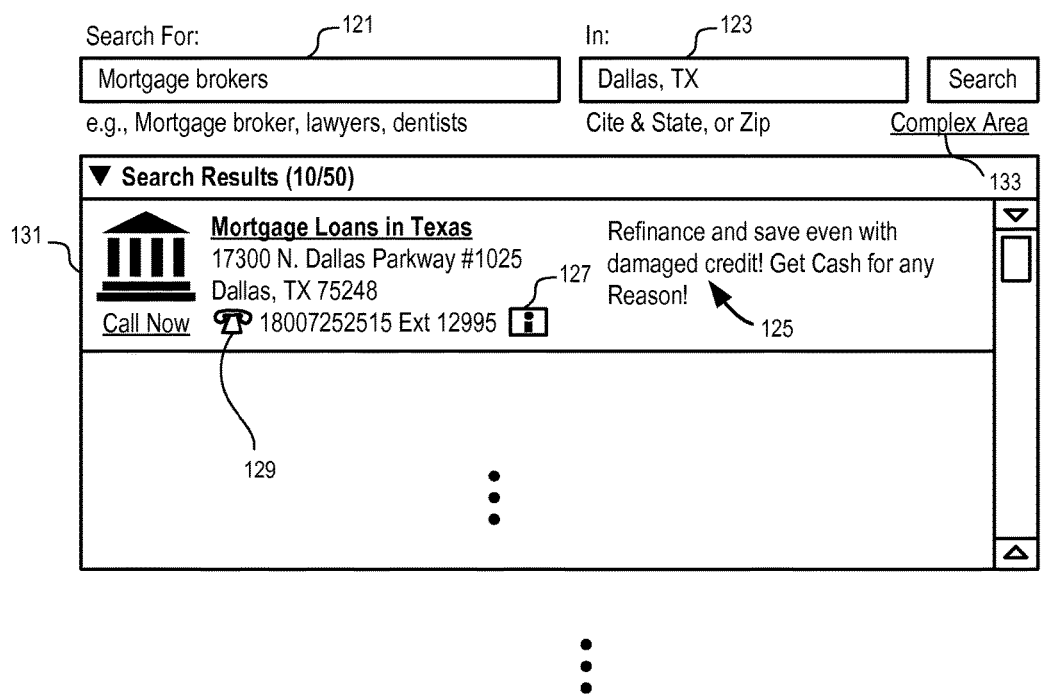
FIG. 4 illustrates a user interface to search advertisements according to one embodiment.

FIG. 4 illustrates a user interface to search advertisements according to one embodiment. The interface as illustrated in FIG. 4 may be presented as a standalone application or as an applet running inside a web browser. Alternatively, a telephonic apparatus that has data communication and processing capabilities and the capability to dial a call via a connection to PSTN or a cellular communication network can also be designed to have the user interface similar to that illustrated in FIG. 4. FIG. 4 illustrates a visual interface for the search of listings/advertisements. Alternatively, a voice portal can also be used to facilitate the access to listings/advertisements. For example, listings can be presented via a human operator or an Interactive Voice Response (IVR) system in a directory assistance call, or a telephone call to a connection server.

In FIG. 4, a search criterion can be specified to request a search of people, advisor, business or predefined categories of services, such as taxi, pizza, florist, electrician, plumber, etc. In FIG. 4, the user can input key words (e.g., "Mortgage brokers") in the entry box (121) under the label "search for" to perform a search for a specific category. In the entry box (123) under the label "In:", the user can input the information about the specific geographic area (e.g., "Dallas, Tex."). For example, a keyword to category algorithm queried with service area returns relevant advertisers, such as "Mortgage Loans in Texas" (131), etc. FIG. 4 illustrates a user interface where two separate entry boxes (121 and 123) are used to receive key words and location separately. Alternatively, a same entry box can be used to receive both key words and location information; and the search engine can be configured to identify the location information specified in the same entry box and separate the location information from the key words.

In one embodiment, the user can also select the link "complex area" (133) to request a user interface for specifying a complex geographic area search requirement. For example, the interface as illustrated in FIG. 3 can be used to replace the entry box (123) when the link (133) is selected. Using the interface as illustrated in FIG. 3, the user can specify more precisely the search requirement with flexibility and easy. In one embodiment, the user can use an interactively displayed map to specify a location or area of interest.

The search result may include advertisements retrieved from the web server (109) and/or the listings retrieved from other databases (e.g., a Yellow page directory, an address book, a database of listings that are created/edited by a community of users, etc.). For example, one database may include the listings that are created and edited by the community of users of softphones. The users can provide, edit, and/or modify a description, comments, ratings, etc., about a business or service provider that is identified by a telephonic reference, such as a telephone number of the business or service provider. Alternatively, the listings may have a portion of description that can be edited by the respective advertiser but not by other users.

In one embodiment, a server is used to perform the integration of the listings obtained from the advertisement database (111) and the listings obtained from other databases for presentation on the user terminal (105).

In one embodiment, some of the advertisements/listings in the search result are retrieved from the advertisement database (111) (e.g., top one or three or five of the search results are from the advertisement database (111)) and some are from other sources. In one embodiment, separate areas are used to show the listings retrieved from the advertisement database (111) and the listings retrieved from other sources.

In one embodiment, the listings from various sources are merged into one listing and sorted according to an indicator (e.g., an indicator of potential revenues that can be generated from presenting the listings, an indicator of relevancy to the search criterion, an indicator that combines a number of consideration including the potential revenue, relevancy and the priorities of the sources of the listings, etc.)

In another embodiment, based on the priorities of the sources of the listings, some of the positions of the sorted list can be pre-allocated to certain types of listings. For example, the top two positions may be reserved for the listings retrieved from the advertisement database (111), the next two positions may be reserved for listings retrieved from an address book, and other positions may be used for other listings sorted according to a potential revenue indicator of the listings.

In one embodiment, the top two or three listings (e.g., advertisements) are reserved for featured listings, which have performance (e.g., customer ratings, conversion rate, and/or earning potential, etc) above a threshold and whose advertisers have placed top bid prices on an advertisement fee. In one embodiment, the advertisement fee is to be charged per the customers calling the advertisers via the advertisements.

In one embodiment, the advertisers are served based on the amount of bids the advertisers placed on the advertisements. For example, the highest bidders matching the search criteria are displayed above and/or before other bidders matching the search criteria are displayed. Alternatively, a value indicator of the listings can be evaluated based on parameters, such as bid price for advertisement fees, conversion rate, earning potential, ratings by prior customers, etc.; and the value indicator can be used to rank the listings.

In one embodiment, one or more advertisements retrieved from the advertisement database (111) are presented above a set of matching listings retrieved from other sources.

In one embodiment, a server can also collect users' description, comments and ratings for the services and/or products offered by the advertisers of the advertisements of the database (111). In one embodiment, the server further maintains data that represents a social network among members of the community of users of the telephonic apparatuses; and the server may selectively present the listings based on a trustworthy indicator determined based on the social network, and/or present the comments, recommendations, feedbacks, ratings, etc., based on the social distance between the caller (101) and the users who made the comments, recommendations, feedbacks, ratings.

In FIG. 4, when an advertisement entry (e.g., "Mortgage Loans in Texas") (131) is selected, the entry is expanded to reveal more advertisement message for the advertiser (e.g., "Refinance and save even with damaged credit! Get Cash For Any Reason!" (125)). In one embodiment, the expanded entry includes a phone icon (129) which can be selected to initiate a telephonic connection with the advertiser using a VoIP application, or via a callback from the connection server, or via a call via a cellular communication connection or a PSTN connection. The telephonic connection may be made to a regular landline phone, or a mobile phone, or VoIP terminal. For example, the telephonic connection may be made through a VoIP application to a phone over a landline, over a cellular communication line to a cellular phone, or over a data communication link (e.g., Internet) to another VoIP application.

In one embodiment, the phone icon (129) includes a SIP URI assigned to the advertisement, which when selected causes a VoIP terminal to call the connection provider using the SIP URI directly, or indirectly via a gateway (e.g., 115).

In one embodiment, the advertisement (131) also includes a telephone number assigned by the connection provider to the advertisement (131). The telephone number may include an extension, which is to be dialed via a telephonic apparatus after being connected to the connection provider. Alternatively, a gateway (115) may provide the extension number in the SIP INVITE message for further connection to the connection server without actually dialing the extension to the connection server. In another embodiment, the telephone number is included in an icon (e.g., 129) without being displayed to the user. In one embodiment, the telephone number is to be used by the VoIP application to construct a SIP URI for a direct SIP call to the connection server (113) (or a SIP gateway 115).

In one embodiment, the user/consumer calls the advertiser using a VoIP application. The phone call is connected to a phone connection server (e.g., of an advertisement provider, which may be the same as, or different from, the service provider of the VoIP application). The phone connection server further connects the phone call to the advertiser. In one embodiment, a separate phone call is placed to the advertiser; and the phone call from the consumer is connected with the phone call with the advertiser.

In one embodiment, the consumer's request to call the advertiser is transmitted to a phone connection server, which makes separate calls to the consumer and the advertiser and joins the separate calls to connect the consumer and the advertiser.

In one embodiment, a telephonic apparatus (e.g., a software based phone, a cellular phone, a computer based phone, a personal digital assistant based phone, etc.) can be programmed to report the duration of the call to a server which records the call duration.

In one embodiment, the phone connection server prevents the consumer and the advertiser from gaining information about the other party from the phone connection. The advertiser is not provided with the telephonic information about the consumer (e.g., the VoIP user ID of the consumer, a phone number of the consumer) in making the phone connection; and the consumer is not provided with the telephonic information about the advertiser (e.g., the VoIP user ID of the advertiser, a phone number of the advertiser). Thus, anonymity of the call is maintained (if the advertiser and the consumer do not reveal their telephonic information during the conversation).

In one embodiment, the advertisement provider/distributor charges the advertiser based on the advertiser's current bid for the phone lead in the category and service area that matches the search submitted by the user of the VoIP application. A caller algorithm of the advertisement provider prevents multiple charges. For example, if calls to the advertisement provider from the user of the VoIP application is within a certain time window, such as an hour, a day or a week, these calls may be considered as providing the same phone lead to the advertiser; and the advertiser is charged for only one phone lead. In one embodiment, the advertisement fee is waived under one or more conditions, such as calls with connections between the customers and advertisers shorter than a threshold, calls terminated before being connected to the advertisers, calls from unrecognized sources, etc.

In one embodiment, a fraud detection system is deployed for the advertisement provider to detect the abuse of the system. For example, the system may detect and stop the use of pay per call advertisement bids as a way to obtain long distance phone calls to a landline phone or a mobile phone.

In one embodiment, the expanded entry further includes an information icon (e.g., 127 in FIG. 4), which can be selected to provide a profile page about the advertiser. For example, the profile page may include the business hours of the advertiser, a description of the advertiser, payment methods accepted by the advertiser for purchasing products/services, categories under which the advertiser is listed, a map showing the location near the advertiser, and/or a link to view map details about the location near the advertiser, etc.

In one embodiment, the advertiser can specify the schedule to receive calls from customers. The advertisement includes an indication whether the advertiser is currently scheduled to receive calls at the time the advertisement is presented. For example, different icons can be presented to indicate the availability. For example, the text "Call Now" or "Schedule a Call" can be used to indicate the availability according to the schedule of an advisor.

FIG. 5 illustrates a user interface for the creation of an advertisement according to one embodiment. The user interface may be presented via web in a web browser or in the VoIP terminal. In one embodiment, the telephone apparatus (103) is configured to communicate with the web server (109) to generate and/or edit the advertisement in the database (111) using the interface (161). Alternatively, the telephone apparatus (103) may communicate with the web server (109) via the listing server (105).

In FIG. 5, an interface (161) allows the advertiser to describe an offer (or a switch pitch, or a cross sell, or some advertising content). The advertiser can specify the business contact information for the advertisement, including the business name, street/mailing address, phone number and fax number. The advertiser/seller is encouraged to tell customers via concise marketing messages what is being offered and why the customers should call the advertiser/seller. For example, the advertiser is encouraged to include promotional offers in the marketing messages to get buyers to call the advertiser. Examples of promotional offers include: "Call today and get $5 off," "Free consultation—limited time," and "Call now and save 10%."

In one embodiment, an audio and/or visual advertisement is generated based at least in part on the information submitted by the advertiser via the user interface (161) (e.g., for presentation via virtual realty, directory assistance service, search result, etc.)

In one embodiment, a short audio advertisement is generated based on the concise marketing message (e.g., two sentences, each having a length limit, such as 35 characters). The concise marketing message can be read by a human to generated a recorded audio file for a short audio advertisement, or be converted into an audio message via a text-to-speech synthesizer. In one embodiment, the audio advertisement also includes the business name.

In one embodiment, a visual presentation of the advertisement may be used to supplement the audio advertisement. For example, the address of the advertisement can be presented in a visual advertisement, together with additional information that is specified in the business profile page of the advertisement. In response to a request from the customer, the visual component of the advertisement can be sent to the customer via an SMS message, via an email, via a custom application, via a web/WAP page, etc.

In one embodiment, the advertisement is sent to a user device in text according to a pre-determined format (e.g., in XML or a custom designed format) to allow a client application running on the user device to present the advertisement in a custom format. For example, the client application may present the short marketing advertisement in an audio form via a text-to-speech synthesize and the present a selected portion of the advertisement as an animation (e.g., present an electronic coupon via an animation). For example, a Java applet can be downloaded into the browser of the user to facilitate VoIP-based phone communication and perform at least part of the text-to-speech operations to enable improved compression in transmitting audio advertisements.

In one embodiment, when an advertisement is presented to the user via a web or a virtual reality environment, the short audio advertisement can also be included; and the audio advertisement can be played automatically or after the user selects the advertisement.

In FIG. 5, the interface (161) may be implemented as a web page. Alternatively, an advertisement may submit the advertising content via a custom client application, or via a message gateway (e.g., an instant message, an email, an SMS message, etc.). In one embodiment, one or more advertisements can be uploaded into a server via a spreadsheet, or via a web service interface.

In one embodiment, the system converts the text input received from the advertiser into an audio advertisement. In one embodiment, the audio file for the advertisement is stored in the advertisement database; alternatively, the text input can be converted into the audio advertisement (e.g., via a text-to-speech synthesizer, or a human announcer) when the audio advertisement is needed. In one embodiment, the machine synthesized audio recording can be stored in the database for a period of time and deleted if not used after a predetermined period of time, or when the usage of the audio advertisement is lower than a threshold.

Figure 6:
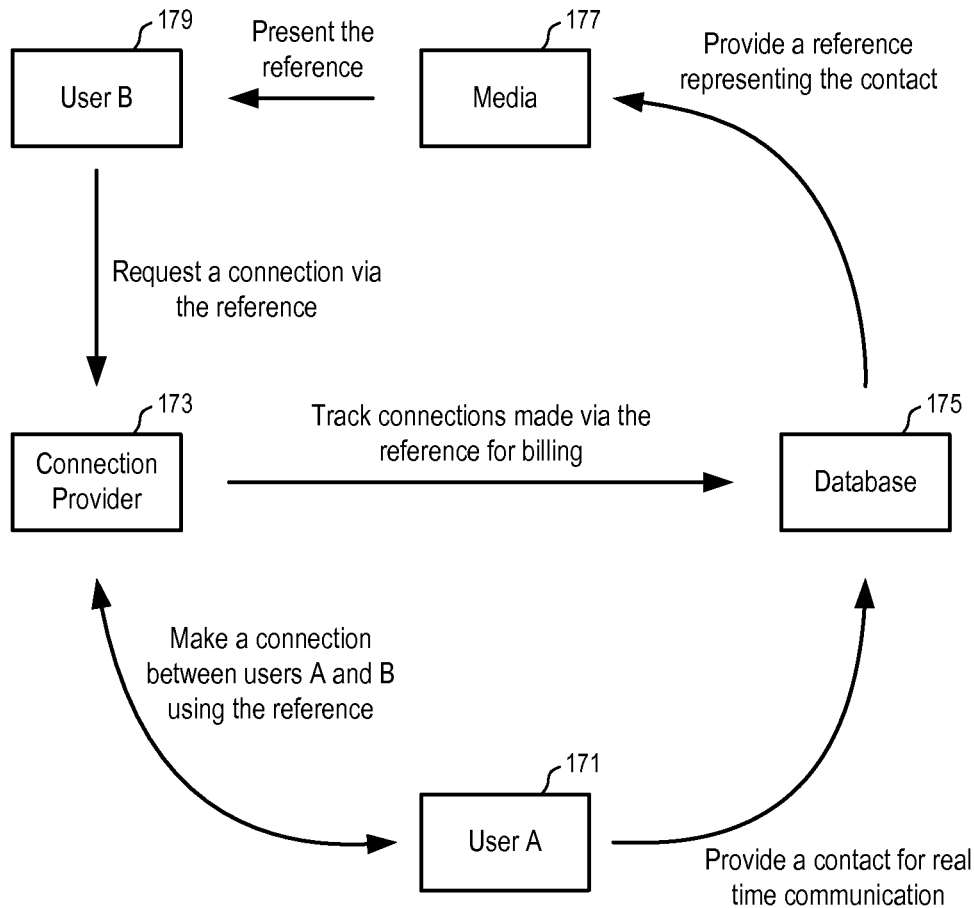
FIG. 6 shows a method to establish connections for real time communications according to one embodiment.

FIG. 6 shows a method to establish connections for real time communications according to one embodiment. In FIG. 6, user A (171) provides a contact for real time communication, such as a telephonic reference of the user A. The contact can be used to establish a connection with user A (171) through a communication network. For example, the contact can be a telephone number of a landline, traditional analog telephone, a cellular phone number, a phone number with an extension, a Universal Resource Identifier (URI) such as a Session Initiation Protocol (SIP) URI, a user identifier of a VoIP application, a user identifier of an instant messaging system, etc.

The contact of the user A (171) is stored in the database (175); and a reference is assigned to represent the contact. Instead of providing the contact to customers, the reference representing the contact is provided through the media (177) to user B (179). Thus, when the user B (179) uses the reference to request a connection with the user A (171), the connections resulted from the advertisement can be tracked to evaluate the performance.

In one embodiment, advertisements can be distributed via a number of media channels operated by a number of demand partners. The reference can also be assigned to identify the demand partners and/or the media channels used to distribute the advertisements. In one embodiment, the information obtained from tracking the demand partners who are responsible for the delivery of a communication lead is used to compensate the demand partner for each delivered communication lead. Alternatively, the demand partners may be compensated according to the advertisement presentations made for the advertiser; and tracked information can be used to determine the performance and/or the cost effectiveness of the media channels.

In one embodiment, the reference can be presented via a variety of media channels, such as a virtual reality environment, newspaper, magazine, telephone directory, web search results, VoIP user terminals, interactive maps, banners, directory assistance service, online marketplace, mobile communication devices, radio, cable/satellite television, interactive television, web television, voice portal, web portal, online auction site, blog, email, bulletin board, refrigerate magnet, brochure, etc.

In FIG. 6, the user B (179) can use the reference obtained from media (177) to request the connection provider (173) to establish a connection or facilitate a communication channel for real time communications between the user A (171) and the user B (179). The connection provider uses the database (175) to determine the contact of the user A (171) and then make a connection between the user A (171) and user B (179) using the contact of the user A (171). Alternatively, the reference may include an encoded/encrypted version of the contact of the user A (171) which can be decoded/decrypted without relying upon the database (175).

In response to the user B's request for a connection, the connection provider (173) may establish two separate connections to the user A (171) and the user B (179) and then bridge the two connections to connect the user A (171) and user B (179). For example, the connection provider (173) may determine the reference from a connection established between the user B (179) and connection provider (173) and then further bridge the connection to the user A (171).

In one embodiment, the connection provider (173) may provide a separate reference to represent the user B (179) and allow the user A (171) to subsequently callback to the user B (179) via the reference that represents the user B (179), if the user A (171) is not currently available for real time communications. The connection provider (173) may schedule an appointment for the user A (171) and user B (179) for a real time communication session. The connection provider (173) may send a notification to the user A (171) to inform the user A (171) about the request for a real time communication.

In one embodiment, the connection provider (173) tracks the connections made via the reference for billing for the advertisement. For example, the connection provider (173) may charge the advertiser for each communication lead deliver to the user A (171).

A communication lead may be limited to a distinct, separate customer such that repeated calls from the same customer within a predefined time period may not be counted as separate communication leads. In one embodiment, the communication lead may also be limited by the duration of a communication session, such that a short session having a duration shorter than a predefined time period may not be counted as a communication lead, and/or a long session having a duration longer than a predefined time period may be counted as more than one communication lead.

In one embodiment, a number of communication leads may be bundled as a package for a subscription fee, or a bid price. Further, the delivery of communication leads may be bundled with an offer of a telecommunication service package. Alternatively, the advertiser may specify a bid price that is to be charged for each communication lead delivered, or a bid limit (e.g., maximum bid) which is to be resolved into an actual bid based on the bid prices of competitors in a category for a specific geographic service area.

Figure 7:
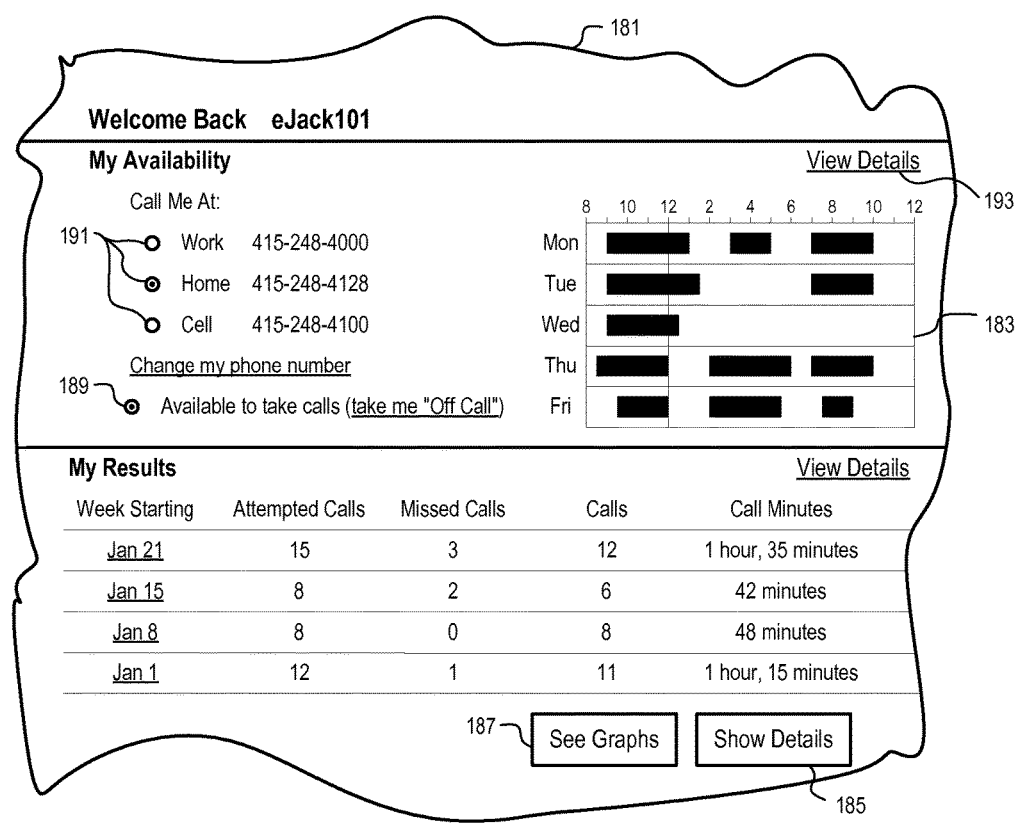
FIG. 7 illustrates an example of a user interface to manage availability for receiving phone calls according to one embodiment.

FIG. 7 illustrates an example of a user interface to manage availability for receiving phone calls according to one embodiment. An advertiser may specify the day and time of availability for accepting the calls for real time communications. Based on the availability, the system may schedule the presentation of the advertisements/communication references more effectively and block unwanted calls.

In one embodiment, the system can store multiple phone numbers of the seller. The system can intelligent route a call to the seller according to the preference of the seller. For example, in FIG. 7, the advertiser/seller may choose a preferred phone number from a set of phone numbers of the seller to receive incoming calls using the option group (191) in the user interface (181). The seller may indicate whether the seller is currently available to take calls or is to be taken "off call" (e.g., using the check box (189)).

In one embodiment, the system allows the seller to specify the schedule to receive calls; and the schedule (183) is displayed to the seller in a graphical way to help the seller to manage calls. In FIG. 7, the user interface (181) includes a link (193) which can be selected to display a user interface (not shown in FIG. 7) to manage the schedule (183).

In one embodiment, when the schedule or the check button (189) indicates that the advertiser/seller is currently not available to take calls for real time communications, the system can decrease the priority of the advertisement for this advertiser, or stop temporarily the presentation of advertisements for this advertiser. When there is a call intended for the advertiser at a time when the advertiser is not taking calls (e.g., according to the schedule), the system can block the call, or direct the call into a voice mail for the advertiser, or arrange a call at an alternative time, or obtain a callback number to allow the advertiser to initiate a callback to the customer.

In FIG. 7, the user interface (181) also includes a summary of call activities. Buttons (187 and 185) can be selected to show graphical representation of the call activities and further details of the call activities.

As the phone calls pass through the system, a wide array of information can be collected and tracked, including day/date/time of calls, duration of calls, call status (answered, no answer, busy), inbound phone numbers, etc.

Such tracked information can be used in counting communication leads generated from advertisements. For example, when multiple calls are made from the same user to the same seller within a period of time (e.g., a day or a week), or in connection with the same offered or auctioned item, these multiple calls can be considered as one qualified call or a single lead.

In one embodiment, different types of communication references can be dynamically selected for advertisements to represent the contact information of the corresponding advertisers. A communication reference used to represent the contact of an advertiser may be a traditional phone number with or without an extension, a click-to-call reference, a SIP address for VoIP call, a click-to-reveal reference, etc. The communication reference can be embedded into an advertisement to count the communication leads generated from advertisements, to track the contributions of demand partners who operate media channels to present the advertisements to customers, and/or to track other aspects of advertising, such as partners who bring the advertisers/sellers to the system and the keywords responsible for the selection of the advertisement for presentation.

In one embodiment, the tracking mechanism used for a particular version of a particular advertisement is selected from a number of available mechanisms, based on one or more considerations such as the volume or frequency of calls generated from the advertisement, the conversion rate of the advertisement (e.g., the ratio between a count of presentations of the advertisement and a count of communication leads generated from the presentations), the price per communication lead that the advertiser is willing to pay for the advertisement according to a price bid specified by the advertiser, a potential revenue for a particular party in the advertising activity, a classification or category of the advertisement (e.g., the category of service or product advertised in the advertisement), a geographical area served by the advertisement, the demand partner who is going to present the advertisement (e.g., the success rate of the demand partner in reaching viable customers in comparison with other demand partners), etc.

Figure 8:
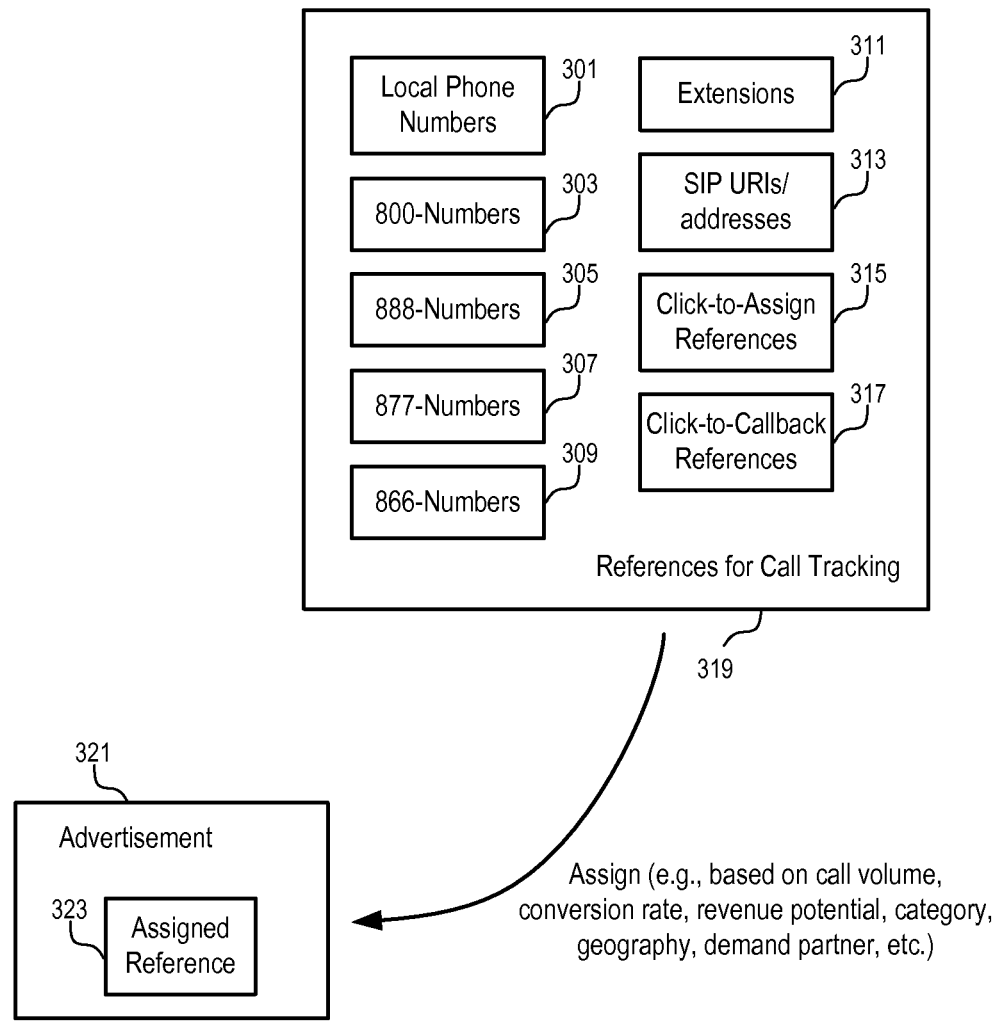
FIG. 8 shows a diagram illustrating a method to select a type of tracking mechanism with a corresponding reference for embedding in an advertisement according to one embodiment.

FIG. 8 shows a diagram illustrating a method to select a type of tracking mechanism with a corresponding reference for embedding in an advertisement according to one embodiment. In FIG. 8, multiple types of tracking mechanisms are used in the system. The tracking mechanism used for an advertisement or a version of the advertisement can be dynamically selected and changed. For example, different versions of an advertisement can be generated for delivery by different demand partners.

In FIG. 8, a pool (319) of different types of references is maintained, such as local phone numbers (301), 800-numbers (303), 888-numbers (305), 877-numbers (307), and 866-numbers (309). Some of the references can be dynamically generated and used, such as extensions (311), SIP addresses (313), click-to-assign references (315) and click-to-callback references (317). In one embodiment, one or more of the references are selected and used as the assigned reference (323) that is embedded in the advertisement (321). In one embodiment, the assignment is based at least partially on factors related to the advertisement, such as call volume, conversion rate, revenue potential, category, geography, demand partner, etc.

In one embodiment, the reference of a particular type is selected and assigned to the advertisement when the advertisement is being requested for delivery. When the advertisement is subsequently requested, the previously assigned reference can be used. Alternatively, when the advertisement is subsequently requested, a different reference of a re-selected type can be selected and assigned to the advertisement, based on the considerations such as the call volume in a past time period, conversion rate, price bid, etc. After the new reference is assigned to the advertisement, the previous reference can be assigned to a different advertisement.

In one embodiment, before the expiration of the previously assigned reference for an advertisement delivered by a demand partner, a new reference can be assigned to the advertisement for delivery by the same demand partner. Thus, multiple references can be associated with a same set of parameters in a time period. Further, since some of the references can be re-assigned to a different advertisement, one reference may be associated with multiple sets of parameters (e.g., for different advertisements). In one embodiment, when a reference is associated multiple sets of parameters, the parameter set that is most recently assigned to and associated with an advertisement has the highest priority; and when the reference is used to request a communication connection with an advertiser, the customer can be prompted to confirm the set of parameters (directly or indirectly) before the set of parameters are used to connect the customer to the advertiser.

In one embodiment, a communication reference that is specific to a selected tracking mechanism is allocated or selected or generated for a particular advertisement. The communication reference is embedded into the advertisement to generate a particular version of the advertisement.

In one embodiment, the tracking mechanism is selected at a time when the particular version of the advertisement is needed for presentation (e.g., when the version of the advertisement is to be delivered to a media channel, a demand partner, or to a web browser of a customer). The corresponding communication reference is allocated or selected or generated when the tracking mechanism is selected.

In one embodiment, the selected tracking mechanism can be dynamically changed at a time when the particular version of the advertisement is needed for presentation (e.g., when the version of the advertisement is to be delivered to a demand partner, or to a web browser of a customer). For example, the tracking mechanism used in an advertisement that is to be presented via a particular demand partner can be upgraded or downgraded based on the statistical data collected from the past activities related to the advertisement.

In one embodiment, a version of an advertisement can have multiple assigned references corresponding to different types of tracking mechanisms. For example, a version of an advertisement may include a SIP address, a reference to arrange a callback and a reference to request an assigned phone number.

The SIP address may be presented in a click-to-call format via a VoIP application. When the customer has a VoIP application readily available, the customer may choose to make the phone call via the SIP address without requesting for a traditional telephone number.

The reference to arrange a callback can be implemented as a link or a button labeled as "Request a phone connection through calling me back". In one embodiment, a form to take the callback number is presented with the link or button. Alternatively, when the link or the button is selected, a further interface (e.g., a web page, a dialog box, etc.) can be displayed to guide the customer through the process of connecting the customer to the advertiser through calling back the customer.

The reference to request an assigned phone number can be implemented as a link or a button labeled as "Show me a phone number", which when selected, causes a phone number to be assigned to the version of the advertisement. After a phone number is assigned to the version of the advertisement, the advertisement can be subsequently displayed with the assigned phone number without showing the reference to request an assigned phone number.

Alternatively, when the "Show me a phone number" link or button is selected, the complete phone number of the advertiser can be shown to allow the customer to call the advertiser directly. In such an implementation, the number of times that the advertiser's phone number is clicked to reveal can be used as a performance indicator, based on which the advertisement is charged for.

In one embodiment, after a period of time of serving the advertisement, statistical data related to consumer responses to the advertisement can be collected and used to adjust the tracking mechanisms for the advertisement. For example, if it is determined that the majority of the phone calls in response to the advertisement is via the SIP address, other tracking mechanisms may be de-allocated from the advertisement, or re-allocated for a different advertisement. Alternatively, the reference may be phased out from the advertisement while the reference is allocated to a different advertisement.

For instance, if an advertisement has a high call volume (e.g., receives many calls), it may be upgraded for a more expensive method of tracking. An advertisement with an extension may be upgraded to a local phone number without an extension, or even a vanity toll-free number, if the performance of the advertisement is above a threshold (e.g., when its conversion rate or call volume is high). Conversely, advertisements that perform poorly may be downgraded in tracking methods used. For example, an advertisement tracked by a toll-free number without an extension may be downgraded to have a number with an extension, a click-to-call connection mechanism.

The tracking mechanism of an advertisement can be determined not only by the performance of an advertisement, but also by the quality of the demand partner or the quality of the customer viewing the advertisement. For example, one advertisement may use an expensive tracking mechanism on one demand partner but may be assigned a different, inexpensive tracking mechanism on a second demand partner who tends to have lower quality customers (e.g., customers who response less frequently to advertisements). The quality of a demand partner may be reflected upon on the difference in the conversion rate of a same advertisement presented via different demand partners, in the numbers of the potential customers the demand partners can reach, the quality of the customers of the demand partners, etc. In another embodiment, the tracking mechanism is directly determined by the quality of the customer himself/herself. For instance, information can be collected about the customer interacting with the advertisements; if the customer is a frequent buyer, an expensive tracking mechanism can be used for the customer. The quality of a customer may also reflected upon the preferences of the customer, the spending habit of the customer, the response rate of the customer to advertisements, the need of the customer, etc. In this case, different customers of different buying tendencies may see the advertisement using different tracking mechanisms at the same demand partners.

In one embodiment, the likelihood of an advertisement being called is estimated based on the type of media channels used to present the advertisement, the demand partner responsible to deliver the advertisement, and/or the customer who views the advertisement. Any characteristics in advertising that have an impact on the likelihood of an advertisement being called and thus the expected revenue/profit generated from the presentation of the advertisement can be used in selecting a tracking mechanism for the particular instance of the advertisement.

In one example, if it is determined that the number of communication leads generated from the assigned phone number is lower than a threshold, the assigned phone number may be reallocated to another advertisement. If the number of communication leads generated from the advertisement is higher than a threshold, the tracking mechanism used for the advertisement may be promoted to a phone number with a short or vanity extension, a phone number without an extension, a vanity phone number, a toll free phone number, a vanity toll free number, a local phone number, or a vanity local phone number. If the number of communication leads generated from the advertisement is lower than a threshold, the tracking mechanism may be downgraded, freeing up tracking resources for other advertisements.

In one example, when advertisements are provided to a demand partner that has a lower success rate in reaching viable customers than other demand partners, this demand partner may be represented using a long extension, leaving short extensions for other demand partners. Alternatively, the advertisements for presentation by the demand partner may be tracked using references for callback or SIP addresses.

In one example, the system may promote the advertisement activities in one geographic area; and the advertisements served in that geographic area receive upgrades in tracking mechanism.

In one example, the advertisements in certain categories of products and services use upgraded tracking mechanisms.

In one embodiment, the advertisements with a pay per communication lead price bid higher than a threshold receives an upgrade in tracking mechanism.

In one embodiment, the system determines weighting factors in various types of communication references (e.g., in terms of cost and benefit in promoting the advertisement), the success rate of the advertisement in various communication channel/demand partner, and the price bids of the advertisers. Based on the collected information, the system can select tracking mechanisms to optimize the potential revenue that can be generated from advertising. In one embodiment, the potential revenue includes the advertisement revenue and/or other revenue that can be generated from the advertisement. For example, when the system takes a commission from the transaction resulted from the advertisement, the potential revenue can include the expected commission from the presentation of the advertisement; and in such a case the system may further use the statistical data related to the successful rate of a call converting into a transaction, an average value of a transaction, the possibility of a repeated call, the average value of a repeated call, etc., in the determination of the potential revenue. In one embodiment, advertisements may qualify for better tracking mechanisms when their pay-per-call bid price reaches a certain value. Similarly, advertisements may qualify for better tracking mechanisms when their overall value reaches a certain threshold. Their overall value can be a function of their bid price, ordinal position, conversion rate, demand source, customer quality, etc.

Figure 9:
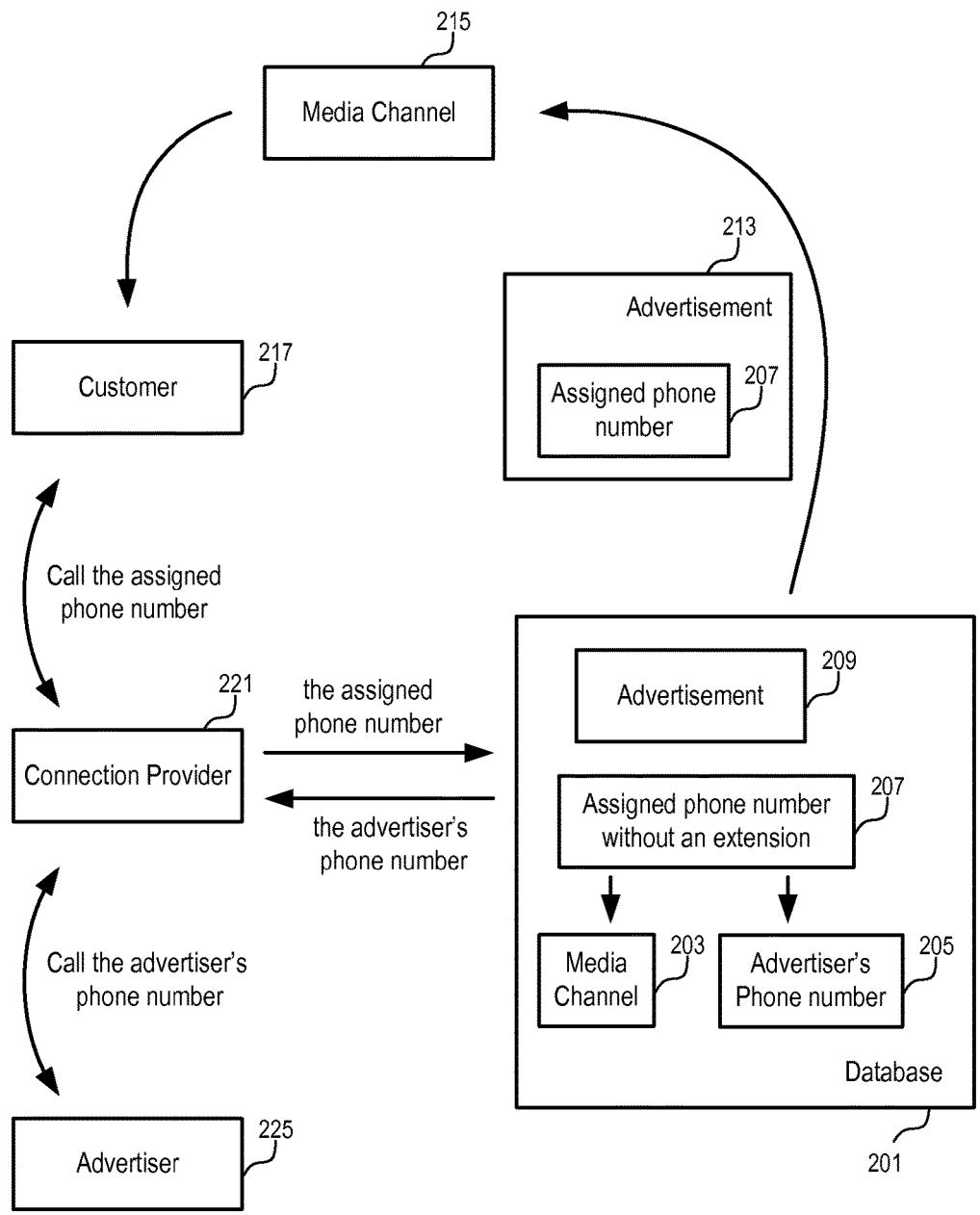
FIG. 9 illustrates an example of telephone call tracking mechanisms which can be selected according to one embodiment.

FIG. 9 illustrates an example of telephone call tracking mechanisms which can be selected according to one embodiment.

In FIG. 9, a phone number (207) without an extension is assigned for the generation a particular version (213) of an advertisement (209). In the database (201), the assigned phone number (207) is associated with the media channel (203) and the advertiser's phone number (205) (and/or other parameters to be tracked). Thus, the parameters to be tracked can be identified based at least partially on the assigned phone number (207). The particular version (213) of the advertisement (209) that has the assigned phone number (207) is provided to the customer (217) via the media channel (215). The advertisement may instruct or suggest the customer to call the assigned phone number (207) to reach the advertiser. In response to the advertisement, the customer may call the assigned phone number (207). When the connection provider (221) is called at the assigned phone number via a telephone carrier, the connection provider (221) can identify the assigned phone number (e.g., via a Dialed Number Identification Service (DNIS)) and determine the advertiser's phone number (205) based at least partially on the assigned phone number (207). Further, using the assigned phone number, it can also be determined that the phone call from the customer is a response to an advertisement that is delivered via the media channel (215) based on the association between the assigned phone number (207) and the media channel (203) in the database (201).

In one embodiment, after determining the advertiser's phone number from the assigned phone number that is dialed by the customer (217), the connection provider (221) makes a separate call to the advertiser (225) via a telephone carrier. When both the customer (217) and the advertiser (225) are on the line with the connection provider (221), the connection provider (221) can bridge or conference the calls to connect the customer (217) and the advertiser (225). Alternatively, the connection provider (221) may forward the calls from the customer (217) to the advertiser (225) after determining the advertiser's phone number.

In one embodiment, the assigned phone number can be a phone number that is local to the area to be served by the advertisement. Alternatively, the assigned phone number can be a toll free phone number, such as an 800- (888-, 877, or 866-) number. In one embodiment, the assigned phone number is a vanity number that spells one or more words on a dial pad on a phone, such as 1-800-PLUMBER for the advertisement of a plumber. Alternatively, the assigned phone number can be a plain phone number.

It is recognized that a local phone number is easy to dial manually, a vanity number is easy to remember, and an 800-number is easier to remember than other toll free numbers. Thus, there are different values in advertising in the different types of assigned phone numbers.

Since maintaining different phone numbers may increase the tracking cost, another type of tracking mechanism uses different extensions to differentiate tracked parameters. For example, different root phone numbers can be used to represent different media channels; and different extensions can be used to represent different advertisers. In another example, different root phone numbers are used to represent different advertisers; and different extensions are used to represent different media channels. In another example, the entire assigned phone number, including the root phone number and the extension, is used as a key to look up the media channel and the advertiser's phone number. In a further example, the root phone numbers are not used to differentiate tracked parameters; and the tracked parameters are represented by the extensions, which may be implemented as keys to look up the parameters or as encoded/encrypted version of the parameters.

In one embodiment, after the customer dials the root number, the customer is connected to an IVR system or a human operator of the connection provider/tracker. After the customer provides the extension to the IVR system or the human operator, the tracked parameters, such as the media channel and/or the advertiser's phone number, can be determined.

In one embodiment, the IVR system or the human operator can prompt the customer for the extension that is provided in the advertisement. When the dialed root number is sufficient to identify information about the media channel, the IVR system or the human operator may customize the prompt to include the information of the media channel and ask the customer to further provide the extension to reach the desired advertiser. When the dialed root number is sufficient to identify information about the advertiser, the IVR system or the human operator may customize the prompt to include the information of the advertiser and ask the customer to further provide the extension to reach the desired advertiser.

The extension can be a plain extension or a vanity extension that spells one or more words on a dial pad on a phone, such as extension PLUMBER for the advertisement of a plumber. In one embodiment, extensions used in the system can have different lengths. A shorter extension is easy to dial; and a vanity extension is easy to remember. In one embodiment, the extension includes an encoded/encrypted version of the associated parameter to allow an authorized data system to decode/decrypt at least some of the parameters without having to query the database. Thus, different types of extensions can have different values in advertising.

The tracking methods described can have different costs. A toll-free number with many extensions, for instance, is much cheaper than many vanity toll-free numbers. Therefore, the system uses the more expensive methods when it's worthwhile to do so. For instance, if an advertisement receives many calls, it may be selected for a more expensive method of tracking. An advertisement with an extension may in the future be upgraded to a local phone number without an extension, or even a vanity toll-free number. Similarly, an advertisement may qualify for a more expensive method of tracking if its conversion rate is high (e.g., if it has a high ratio of the number of calls it receives to the number of times it is displayed). Conversely, advertisements that perform poorly may be downgraded in tracking methods used. For example, an advertisement tracked by a toll-free number may be downgraded to have a less expensive, click-to-call connection mechanism.

In one embodiment, the connection provider calls the customer instead of providing a phone number to receive a phone call from the customer. For example, the reference assigned to represent the contact of the advertiser may not be used to make a call via a traditional telephone carrier. The reference can be submitted to the connection provider via a data communication, such as an email, an SMS message, a web request, or other types of data communication. The reference can be used as a key in the database to look up the associated parameters, such as the media channel and the advertiser's phone number. In one embodiment, the reference is an encoded/encrypted version of the associated parameters, such that an authorized data system can decode/decrypt the information without having to look up from the database. After the reference is provided to the connection provider with the request for a connection, the connection provider can callback to the customer to establish the connection between the customer and the advertiser. The request may include a callback phone number of the customer. Alternatively, a customer may be prompted to provide the callback phone number in response to the request. The connection provider can connect the customer and the advertiser by calling the customer and the advertiser separately and bridge/conferences the calls, or by forwarding one call (e.g., the call to the customer) to another (e.g., to the advertiser).

In one embodiment, a telephone number assigned to a version of an advertisement includes a SIP address for the initiation of a VoIP-based telephone call. The SIP address can be used for a manually dialed call on a SIP-enabled phone, or be used in a click to call format. In one embodiment, the SIP address includes an encoded/encrypted version of the contact of the advertiser such that the connection provider can decode/decrypt the contact of the advertiser from the SIP address without having to look up from database.

In one embodiment, the allocation of a telephone number to an advertisement is deferred to a stage when a customer is interested in the advertisement and ready to make a phone call. A reference embedded in the advertisement can be used to specifically request for the telephone number that is assigned to the advertiser by the connection provider. The request can be sent as a web request in response to a click on a link, or as an email, an SMS message, or an instant message. The assigned telephone number may be a toll free phone number without extension, a local phone number with an extension, a SIP URL, etc. Alternatively, the reference can be used to request the actual phone number of the advertiser.

Figure 10:
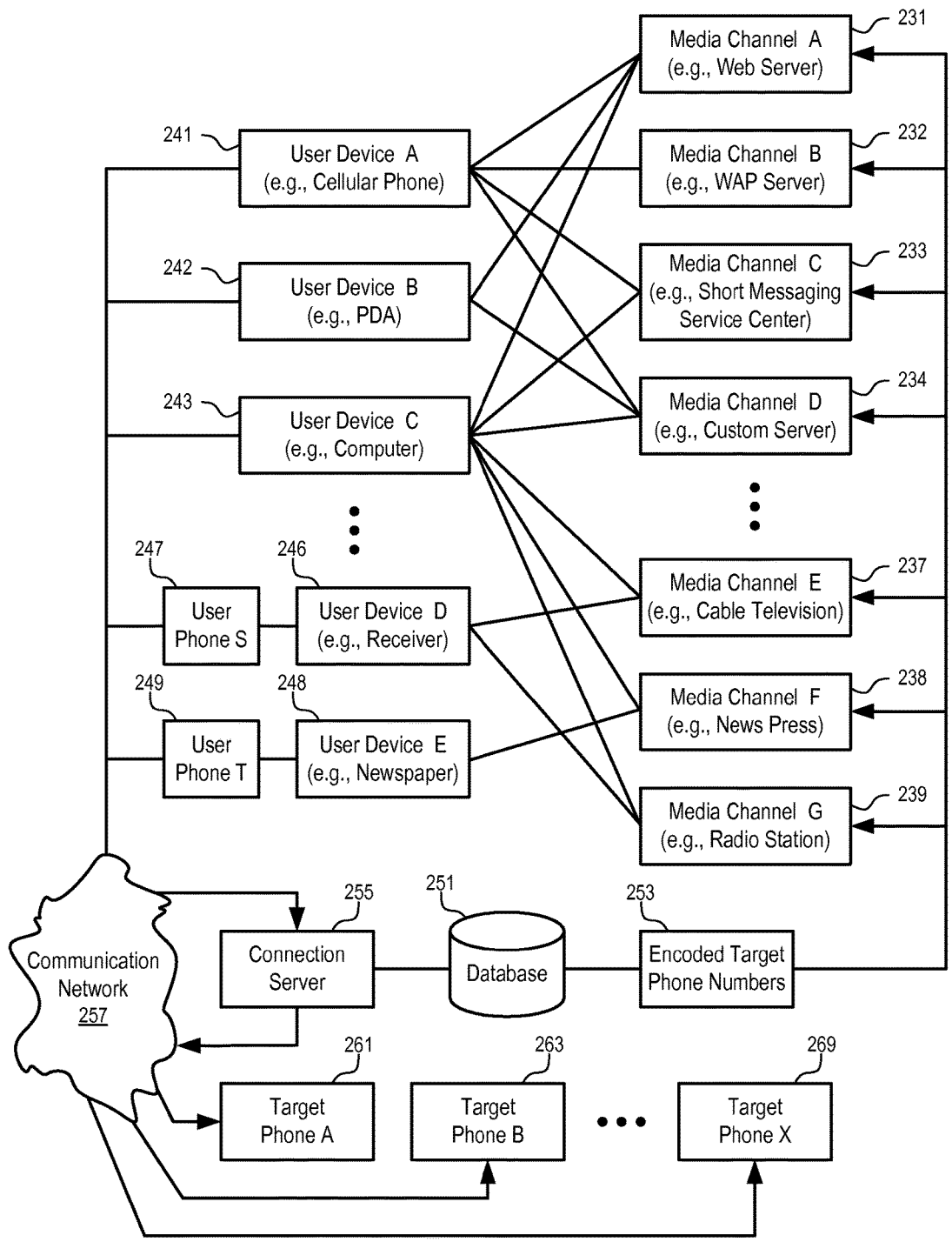
FIG. 10 shows a diagram of a system to make and track phone connections according to one embodiment.

FIG. 10 shows a diagram of a system to make and track phone connections according to one embodiment. In FIG. 10, a database (251) may contain the phone numbers of target phone A (261), target phone B (263), . . . , target phone X (269), etc. Typically, the target phones belong to the institutions, businesses, individuals, etc, which seek for publicity through various media channels, such as media channel A (231) (e.g., web server), media channel B (232) (e.g., WAP server), media channel C (233) (e.g., short messaging service center), media channel D (234) (e.g., custom server), media channel E (237) (e.g., cable television), media channel E (238) (e.g., news press), media channel G (239) (e.g., radio station), and others such as virtual reality, directory assistance service, interactive maps, etc.

In one embodiment, the phone numbers of the target phones are not directly publicized over the media channels. Instead, encoded target phone numbers (253) are used. Using the encoded target phone numbers (253), a user cannot reach target phones directly. The encoded target phone numbers (253) allow the association of additional information with the target phone numbers, such as the media channels used, special promotions, etc.

The encoded target phone numbers are delivered with content information (e.g., web page, WAP page, short message, television programs, news articles, virtual reality, etc.) to user devices, such as user device A (241) (e.g., cellular phone), user device B (242) (e.g., personal digital assistant (PDA)), user device C (243) (e.g., computer), user device D (246) (e.g., receiver), user device E (248) (e.g., newspaper).

In one embodiment, a user device can include a USB phone, a Bluetooth wireless phone, or one or more speakers or headphones with one or microphones for the implementation of a software based phone (softphone).

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. In one embodiment, the user devices/phones support the display of virtual reality.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (247) or user phone T (249).

In one embodiment, dialing at least a portion of an encoded target phone number connects the phone call to a connection server (255) first. According to the encoded target phone number dialed, the connection server (255) determines the corresponding target phone number using the database (251) and connects the phone call to the corresponding target phone (e.g., one of target phones 261-269) through the communication network (257).

Note the communication network (257) may be circuit switched, packet switched, or partially circuit switched and partially packet switched. For example, the telephone network may partially use the Internet to carry the phone call (e.g., through VoIP). For example, the connection between the user phone/device and the connection server (255) may be carried using VoIP; and the connection between the connection server (255) may be carried using a land-line based, circuit switched telephone network.

In one embodiment, the information associated with the encoded target phone number, such as the media channel used to provide the encoded target phone number to the users, is also decoded/retrieved using the database (251). Thus, the information associated with the encoded target phone number can be tracked/stored.

In one embodiment, the connection server (255) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment, an encoded target phone number has the same number of digits as a standard phone number (e.g., a typical telephone number assigned by a telephone company). Thus, dialing the encoded target phone number is as easy as dialing the target phone number; and dialing the target phone number reaches the connection server (255). In such an arrangement, a large number of encoded phone numbers are generally required to differentiate the different target phones and different media channels.

In one embodiment, an encoded target phone number has more digits than a standard phone number. A first portion of the encoded target phone number has the same number of digits as a standard phone number to reach the connection server (255) through the communication network (257); and a second portion of the encoded target phone number is to be decoded by the connection server (255). For example, the Dual Tone Multi-Frequency (DTMF) decoder can be installed in the connection server (255) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment, a single telephone number is used to reach the connection server (255) for different target phone numbers; and the portion of the encoded target phone number that is used to reach the connection server (255) is not used in determining the information associated with the encoded target phone number.

Alternatively, multiple telephone numbers can be used to reach the connection server (255); and the entire encoded target phone number can be used to determine the information associated with the encoded target phone number.

In one embodiment, the encoded target phone numbers can have different numbers of digits. The advertisers may be arranged to bid for shorter encoded target phone numbers.

In one embodiment, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (251) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the connection server (255). When such a mapping scheme is used, a look up table is not necessary. For example, an encoded target phone number may include a first portion that is the phone number of the connection server (255), a second portion that is the target phone number appended with a number mapped from an identifier of the media channel. To prevent the user from dialing the target phone number directly, an encryption/scrambling scheme can be used to encode the second portion, which is decoded at the connection server (255).

In one embodiment, the connection server (255) determines the target phone number from the encoded target phone number dialed by the user and then dials the target phone number for the user and joins/bridges the phone calls so that the user can talk to the target phone.

In one embodiment, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment, the encoded target phone numbers are presented in the content information in a format such that when the user selects the phone number the user device (e.g., a cellular phone or a computer) dials the encoded target phone number for the user. The user selection may be in the form of a keyboard/keypad input, a touch pad input, a track ball input, a mouse input, a voice command, etc.

In one embodiment, the user device initiates the phone call through a VoIP system when the user selects the encoded target phone number.

In one embodiment, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment, the encoded target phone numbers are formatted so that the user device dials a first portion of the encoded target phone numbers to access the connection server (255), pauses for a short period of time for the connection server (255) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 10, the user device initiates the phone call. Alternatively, a connection server may be used to initiate phone calls both to the user device (or a separate user phone) and the target phone and then join/bridge the phone calls to connect the user to the target phone. For example, when the user selects the encoded target phone number, the selection of the target phone number is transmitted to the connection server with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the connection server. Alternatively, the content information can be formatted so that the selection is sent directly to the connection server.

When the connection server starts the phone calls, the encoded target phone number can also include alphabetic characters (and/or other characters). The connection server can decode the encoded target phone number to recover/retrieve the target phone number and other associated information, such as the identity of the media channel that is creditable for providing the encoded target phone number to user.

In one embodiment, an advertisement is presented to end users around the globe without geographical area limitations. For example, an advertiser may provide services and/or products to customers around the globe. The advertisement may be delivered to the worldwide users of the Internet.

In one embodiment, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment, an advertisement presented in a media channel is for a single advertiser. The end user selects an advertiser according to the advertisements presented on behalf of individual advertisers; and the connection server connects the end user and the selected advertiser according to the encoded target phone number individually publicized in the advertisement for the advertiser. When the user views the online advertisements, the selection of the advertiser is based on the online information.

In one embodiment, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the connection server.

For example, a toll-free number is published to advertise mortgage brokers in a particular geographic area. When a consumer dials the toll-free number, the call is routed to the highest bidding mortgage broker who is available in that market.

The connection server may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Figure 11:
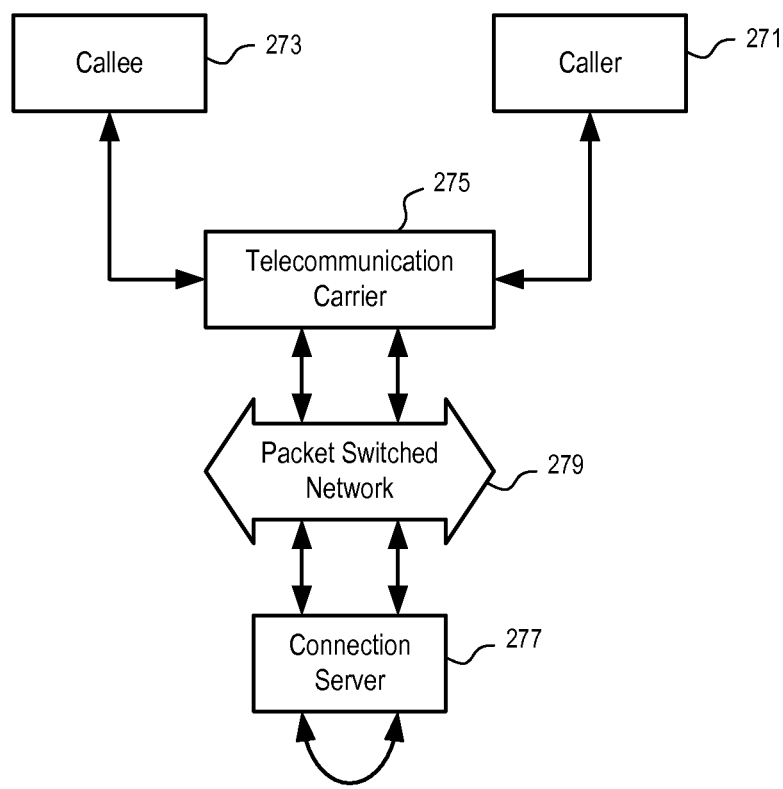
FIG. 11 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 11. In FIG. 11, the connection server (277) receives and/or places telephone calls via the telecommunication carrier (275) over the packet switched network (279). The telecommunication carrier (275) further routes the telephone communications towards the caller (271) and the callee (273).

Since the telecommunication carrier (275) can route a call from a packet switched network to a variety of destinations (e.g., a traditional analog telephone set, a mobile phone, a cellular phone, a WiFi phone, a Bluetooth phone, a softphone running on a computer, etc.), the connection server (277) can use one type of communication connection with the telephone carrier (275) to facilitate the communication connections with variety of devices used by the customers (e.g., callers and callees). Thus, the implementation of the connection server (277) can be simplified. In one embodiment, the connection server (277) can also place and/or receive direct VoIP calls to/from the caller (or callee).

For example, to make a voice connection in response to a click-to-call request, the connection server can place separate VoIP calls, via the telecommunication carrier (275), to the caller (271) (e.g., the requester of the click-to-call) and the callee (273) (e.g., the destination of the click-to-call request).

If the caller (271) (or the callee 273) is on a public switched telephone network (PSTN), the telecommunication carrier (275) bridges the packet switched the network and the public switched telephone network (PSTN). The telecommunication carrier (275) routes the call from the packet switched network (279) to the caller (271) (or the callee 273) on the circuit switched network. Thus, the caller (271) (or the callee 273) can use a telephone set to receive the call via a Plain Old Telephone Service (POTS). The connection server (277) joins the separate calls that are placed via the packet switched network (279) to connect the callee (273) and the caller (271).

In one embodiment, call signaling and media content may use different network paths. While call signaling is arranged to go through the packet switched network (279) and the connection server (277), the media stream does not have to go through the connection server (277). For example, when the calls are joined, the media content may be redirected to flow over the communication carrier (275) without going through the packet switched network (279) to the connection server (277) for improved performance and efficiency. The connection server (277) can release the control over the media stream to allow the media stream to flow through the shortest path, without going through the connection server, while maintaining control to the connection for the call by staying on the path for call signaling.

In another example, when the caller (271) initiates a call over a PSTN to the connection server (277), the telecommunication carrier (275) converts the call for the packet switched network (279) for the connection server (277).

In one embodiment, virtual softphones on the telecommunication carrier (275) are assigned to the caller (271) and the callee (273) for interfacing with the connection server (277) over the packet switched network (279). The virtual softphones encapsulates the devices and networks used by the caller (271) and callee (273) to access the connection server (277); and the telecommunication carrier (275) shields the connection server (277) from the implementation details of the user devices and networks used by the caller (271) and the callee (273). The connection server (277) calls (or receives calls from) and connects the virtual softphones on the telecommunication carrier (275) to connect the caller (271) and the callee (273).

In FIG. 11, the telephone connection between the telecommunication carrier (275) and the connection server (277) is facilitated via a packet switched network (279). Thus, the connection server (277) can operate efficiently in a digital domain. The connection server (277) interfaces with the telecommunication carrier (275) using one type of Internet Telephony systems (e.g., SIP-based Internet telephony).

Alternatively, a connection server may include some or all of the functionality of the telecommunication carrier (275). For example, the connection server may be configured to bridge a packet switched network and a circuit switched network. The connection server may support multiple, different types of Internet Telephony systems.

In one embodiment, the connection server (277) and the telecommunication carrier (275) are operated by different, separate entities. Alternatively, the connection server (277) and the telecommunication carrier (275) may be operated by the same entity. In another embodiment, the telecommunication carrier (275) includes a set of facilities operated by a number of separate entities.

In one embodiment, the caller (271) and/or the callee (273) may also place/receive calls via a packet switched network. The telecommunication carrier (275) may route the calls between the caller (271) and the callee (273) without using a PSTN. In one embodiment, caller (271) and/or the callee (273) may place calls to or receive calls from the connection server (277) via Internet.

Figure 12:
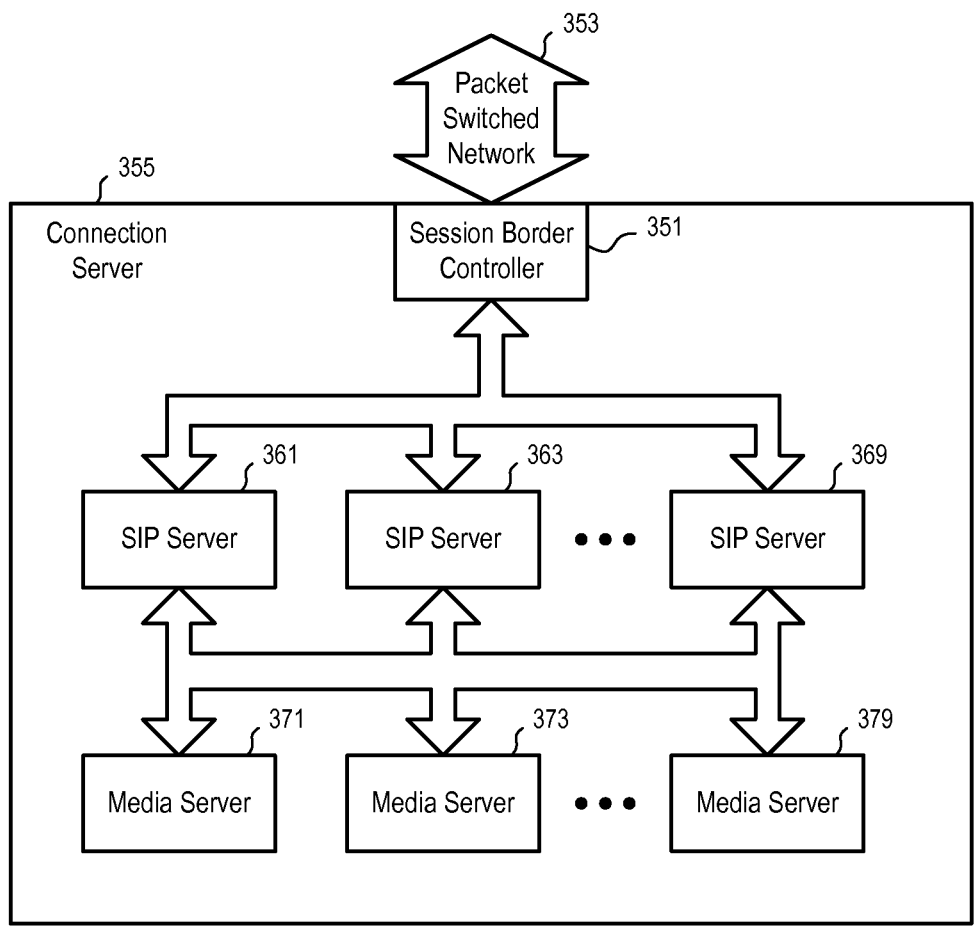
FIG. 12 shows a connection server according to one embodiment.

FIG. 12 shows a connection server according to one embodiment. In FIG. 12, the connection server (355) is configured to place and/or receive VoIP calls using Session Initiation Protocol (SIP). A session border controller (351) is used to interface with the packet switched network (353) and control the types of network traffic related to VoIP calls that might go into the connection server (355).

In one embodiment, the session border controller (351) is configured to control the signaling and media stream during the setting up, conducting and tearing down of VoIP calls to or from the connection server (355). In some embodiments, the session border controller (351) may pick up the call that comes to the session border controller (351), places a separate call from the session border controller (351), and joins the received call and the placed call to control both the signaling and media stream. In some embodiments, the session border controller (351) may perform signaling/ encoding translation to allow the connection server (355) to process the VoIP calls in one standard, while receiving VoIP calls in a variety of standards (e.g., SIP, H.323, etc.). In one embodiment, the session border controller (351) is configured to perform one or more firewall functionalities, such as denial of service protection, call filtering, bandwidth management, etc.

In one embodiment, the session border controller (351) is configured to perform media releasing operation. When the session border controller (351) determines that the source and destination of a media stream is on the same side of the session border controller (351) (e.g., both the source and the destination of the media stream is outside the connection server 355), the session border controller (351) can release the hairpinning of the media stream and allow the media stream to flow without going through the session border controller (351).

In FIG. 12, a set of SIP servers (e.g., 361, 363, . . . , 369) are networked to the session border controller (351) to receive messages for incoming calls and to initiate outgoing calls. The session border controller (351) is configured to evenly distribute the calls for processing by the SIP servers.

For example, when an incoming message for the initiation of a call is received (e.g., a SIP INVITE message from the telecommunication carrier 275), the session border controller (351) may route it to a SIP server (e.g., 361) for processing. The INVITE message includes the phone number dialed by the caller and the contact information about the caller (e.g., the phone number of the caller 271 and/or the identity of the virtual SIP phone at the telecommunication carrier 275).

The SIP server may determine whether the phone number dialed by the caller (273) is sufficient to determine the phone number of the callee (e.g., 273). If the phone number of the callee (e.g., 273) can be determined from the phone number dialed by the caller (273) (e.g., via decoding the phone number dialed by the callee, or looking up the phone number of the callee from a table using the phone number dialed by the caller as a key), the SIP server can place a separate SIP call to the callee via the packet switched network (353) and then connect the caller and the callee. Alternatively, the SIP server can further route the SIP INVITE message (e.g., to the telecommunication carrier (275) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identify a media server (371) (or a virtual softphone on SIP server) as the initiator for a separate call. The SIP server then connects the calls for the media stream.

In one embodiment, the caller is first connected to a media server (e.g., 371, 373, or 379). For example, the SIP server may forward the SIP INVITE message to one or more of the media servers for answering the call. When a media server (e.g., 371) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (353) (e.g., by sending a SIP INVITE message to the telecommunication carrier 275, which further bridges the call to the callee 273). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (351) into the connection server (355). For example, the media stream can go through the telecommunication carrier (275) in FIG. 11 without going to the connection server (277) after the SIP server connects the caller and the callee.

However, the SIP server stays on the signaling path to monitor the progress and termination of the call. The SIP server can also break the connection between the caller and the callee, or force the media stream to come through the connection serve (355). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (353) for a connection to the caller. The SIP call may be bridged onto a circuit switched network (e.g., by a telecommunication carrier 275). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (361, 363, . . . , 369) and media servers (371, 373, . . . , 379) are implemented on separate computers connected via a local area network (and/or intranet or Internet). Alternatively, at least the some of the servers can be implemented on a same computer. In one embodiment, the SIP servers and the media servers are also integrated with the session border controller (351) on a same data process system having multiple processors coupled with a data bus. In one embodiment, the SIP servers are coupled to the media servers via a network; and a SIP server may use any of the available media server for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (355) may further include a database server (355) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

Figure 13:
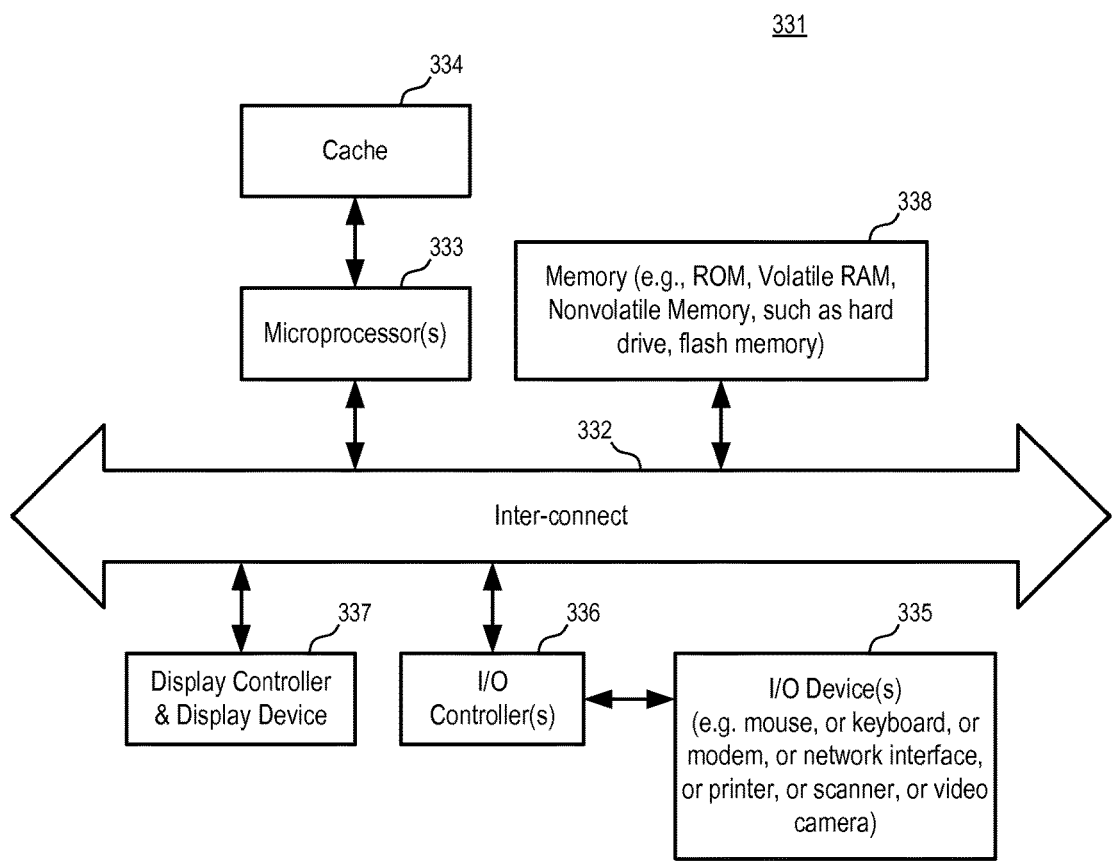
FIG. 13 shows a block diagram example of a data processing system which may be used in various embodiments.

FIG. 13 shows a block diagram example of a data processing system which may be used in various embodiments. While FIG. 13 illustrates various components of a computer system, it is not intended to represent any particular architecture or manner of interconnecting the components. Other systems that have fewer or more components may also be used.

In FIG. 13, the communication device (331) is a form of a data processing system. The system (331) includes an inter-connect (332) (e.g., bus and system core logic), which interconnects a microprocessor(s) (333) and memory (338). The microprocessor (333) is coupled to cache memory (334) in the example of FIG. 13.

The inter-connect (332) interconnects the microprocessor(s) (333) and the memory (338) together and also interconnects them to a display controller and display device (337) and to peripheral devices such as input/output (I/O) devices (335) through an input/output controller(s) (336). Typical I/O devices include mice, keyboards, modems, network interfaces, printers, scanners, video cameras and other devices which are well known in the art.

The inter-connect (332) may include one or more buses connected to one another through various bridges, controllers and/or adapters. In one embodiment the I/O controller (336) includes a USB (Universal Serial Bus) adapter for controlling USB peripherals, and/or an IEEE-1394 bus adapter for controlling IEEE-1394 peripherals.

The memory (338) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 13 is used as one of the communication server(s), virtual reality server(s), connection server(s), database server(s), media server(s), controller(s), router(s), gateway(s), etc.

A user terminal as a client system can be a data processing system similar to the system of FIG. 13. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

In one embodiment, a user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. Other types of traditional communication client(s) may be used in some embodiments.

FIG. 14 shows an example user interface for the selection of a geographic area for advertisers according to one embodiment.

In FIG. 14, a user interface (401) is presented to collect information for specifying the content of an advertisement. In one embodiment, the user interface (401) is in the form of a web page rendered in a web browser of a user device, such as a computer, a notebook, a PDA, a web terminal, etc. The web page is to be downloaded from a server that is connected to the database for the advertisements. Alternatively, the user interface (401) can be based on a WAP application on a wireless mobile device, such as a cellular phone. Further, similar entry fields can be provided through the use of other communication channels, such as Email, Instant messages, SMS messages, etc. Further, an advertiser may fax a form, or make a telephone call, to provide the information to a human concierge, which uses such a user interface to enter the data into the database (e.g., using a custom application).

In FIG. 14, a section (403) of the user interface contains entry fields for specifying the information an advertiser want to appear on the advertisement. The business name field (411) is to receive the name of the advertiser, which can be used to identify the advertiser in the database and in the advertisement.

The address, city, state, country and zip fields (413, 415 and 417) are to receive the location information about the advertiser. The location is typically a site where a potential customer may visit to obtain services and/or products.

Figure 15:
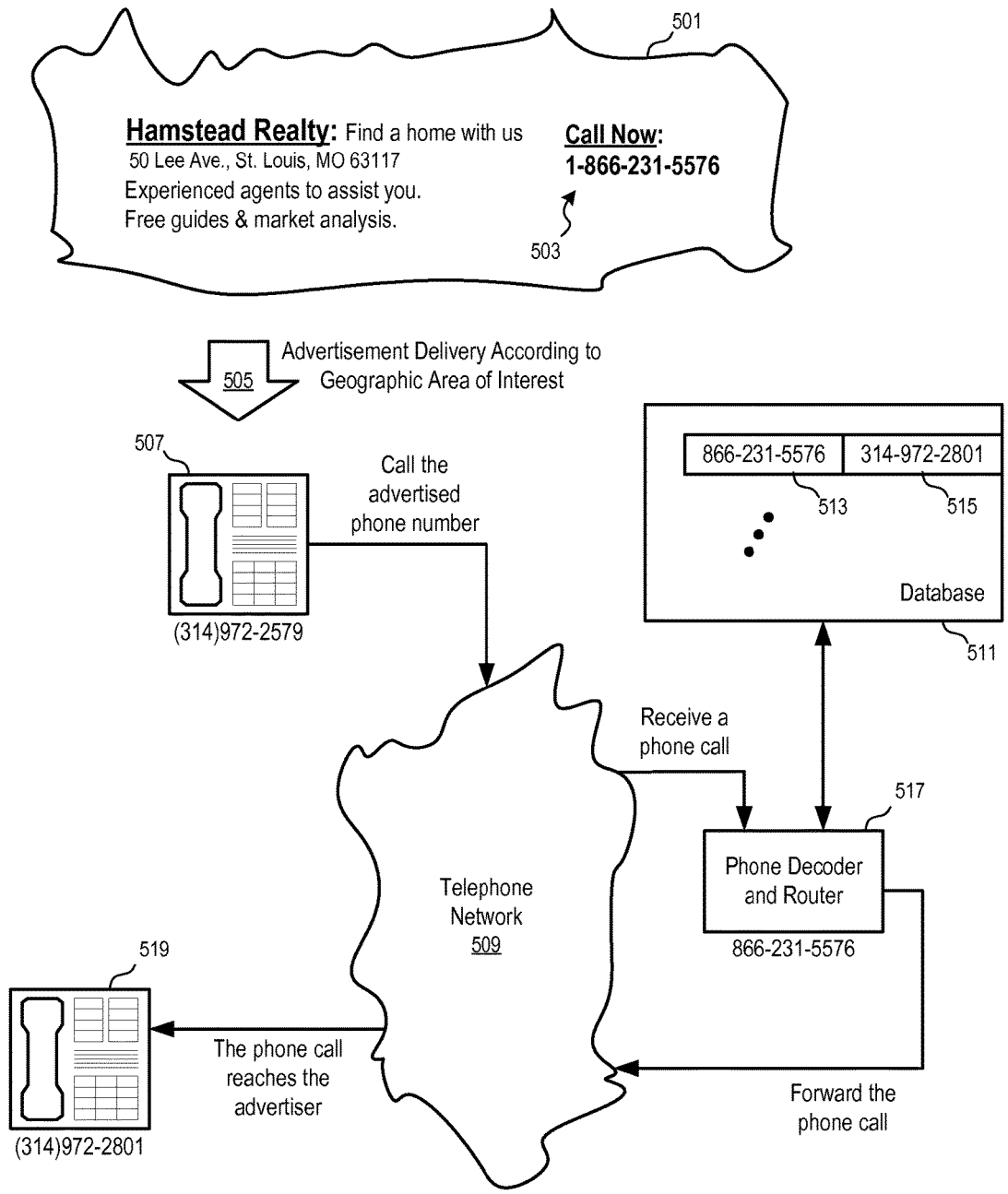
FIG. 15 shows a diagram of connecting phone calls according to geographic areas of advertisers and callers according to one embodiment.

The phone field (419) is to receive the telephone number at which the advertiser is to receive phone calls from potential customers. In one embodiment, the phone number of the advertiser in the phone field (419) is not shown directly to the end users. An encoded phone number is used in the advertisement, as illustrated in FIG. 15, so that when the encoded phone number is called the phone number of the advertiser is determined and connected to. This allows the tracking of phone calls generated from various advertisements for different advertisers and/or generated through different advertisement delivery channels.

The web site URL field (421) is to optionally receive a home web page address of the advertiser. In one embodiment, the advertisement is generated to contain a link to the web page as specified in the web site URL field (421) so that if the end user wants further details about the advertiser, the end user may click the link to visit the web page of the advertiser. In one embodiment, the advertiser is not charged for the link directing the web user to the web page of the advertiser. Alternatively, the advertiser may be charged for the link that is clicked to lead the web user to the web page of the advertiser.

In one embodiment, the advertisement is not to include a link to the web site URL (421). The web site URL (421) is used to obtain further information about the business of the advertiser so that the advertisement can be placed in relevant media channels.

For example, the web pages at the web site according to the web site URL can be fetched and analyzed automatically to determine topics, categories, keywords, content, etc., so that the placement of the advertisement can be based at least partially on the topics, categories, keywords, content, etc. to increase the chances of the advertisement being of interest to the targeted users.

The tag line field (423) and the description field (425) are to receive one or more concise statements about the business offering, the unique ways of meeting customers' needs, how the business stand out from the competition, etc. In one embodiment, the information in the description field is presented in a text form. In one embodiment, the text in the description field can be enhanced with boldface and italic type, as well as formatting, using a Rich Text Editor, as supported by Internet Explorer for Windows or Mozilla Browsers (e.g., Firefox, Netscape, etc.).

In one embodiment, further optional information, such as a logo, an electronic coupon, etc. (not shown in FIG. 14), can be specified for the advertisement. In one embodiment, to provide an electronic coupon, one can simply specify a coupon headline, description and expiration date (if any). The coupon information is then store in the database and presented with the advertisement.

In one embodiment, the section (405) of the user interface contains entry fields for specifying the geographic area in which the business provides services or products. In one embodiment, the service center area or location can be specified through the selecting a center from various options (427) of different scales. For example, the center may be at the address as specified in the section (403) (e.g., address 413 in city, state, and country 415), if the "my address" option is selected. Alternatively, the center may be an area of a particular zip code, a city, a state or a country. In one embodiment, if no further detail is specified in the entry boxes (441-447) for the centers, the corresponding information as specified in the section (403) for the business address is used. For example, if the center is at an area of a zip code, the default zip code area is according to the zip code specified in the zip code field (417), unless a different value is specified in the next entry field (441).

Alternatively, other types of center areas can also be specified. For example, the center area can be specified as an area of particular telephone area code, or an area of particular telephone area code and exchange, or a school district, a county, a metropolitan area, a region, a custom defined area, etc.

For example, in one embodiment, when the "other" option (449) is selected, a user interface (not shown in FIG. 14) is provided to allow one to define a different street address as the center, or define a custom area on a map (e.g., a telephone area code map, a zip code map, a street map, a commercial district map, a state map, a national map, a world map, etc.) In general, the targeted geographic area as specified in the section (405) can be the same or very different from the physical location of the business. For example, a Louisiana-based travel company can define Hawaii as a targeted area in order to sell Hawaii vacation packages. Further, for example, the travel company may select the union of several states, which may be separate from each other on the map, as the target area.

In one embodiment, the service area can also be defined as the center area with a surrounding area up to a distant way from the center area. For example, a service radius (429) can be used to specify the surrounding area with respect to the service center. In one embodiment, the service radius extends the surrounding area from the boundary of the center area; alternatively, the service radius may represent the area from the geometric center of the service center. Different scales of units, such as mile, feet, yard, etc., can be selected for the radius value.

Alternatively, the radius may be specified in terms of average travel time, such as the number of minutes for a walking distance or driving distance.

In one embodiment, the radius can be specified in terms of characteristics such as within walking distance, driving distance, etc. The system then determines an appropriate range according to the traffic condition for the area around the business location that is specified in section 403 and/or around the service center (427).

In one embodiment, "neighborhood", such as Soho or Chinatown, that may be a combination of multiple districts, can be specified as the targeted geographic area. Such areas can be predefined in the database based on real-world information of where consumers lie. Alternatively, such neighborhoods can also be specified in a user interface (not shown in FIG. 14) by drawing polygons (or other shapes, such as closed curves, ellipse, circles, etc.) upon a map to define the area the advertiser would like to market to. In one embodiment, an advertiser can select (e.g., click) on several shapes (e.g., polygons, closed curves, etc.) to include, or exclude, regions in the desired marketing area. For example, a target geographic area can be the union of a set of shapes defined on a map, excluding the union of another set of shapes defined on the same map (or a different map).

In one embodiment, the user interface may automatically suggest a service area based on the information collected about the business, such as the category of the business, the service type, and/or the scale of the business in view of the knowledge about the service areas of typically similar businesses. The advertiser may then modify the suggested area to specify a desired target geographic area.

Further, the system may present a geographical distribution and a distance distribution of calls generated from advertisements for similar businesses in the past as reference materials for the advertiser. The automatically suggested areas can also be based on statistical data of telephone calls generated from advertisements.

In FIG. 14, the user can select the icon button (451) to request further user interface elements to specify one or more additional geographic areas that are used to modify the area specified via the center and the radius. For example, a second geographic area can be specified to indicate that the service area is in the area specified by the radius (429) but not in the second geographic area (e.g., a city, a count, or state).

In one embodiment, the section (407) of the user interface contains buttons for disposing the data entered in the fields of the user interface (401). For example, one may select the submit button (433) to commit the data into a database (e.g., submitting through a web server, a WAP server, an email gateway, an SMS/instant message gateway, etc.). Alternatively, one may select the cancel button (431) to discard the data. Buttons for other types of actions (not shown in FIG. 14), such as preview of the advertisement, can also be included.

Although the example in FIG. 14 shows that both the section (403) for the content of the advertisement and the section (405) for the geographic area are arranged in the same user interface (401), it is understood that different types of arrangements can be made. For example, different sections may be included in different windows/screens. Further, other sections, such as the entry fields for the specification of business categories, work hours, work days, keywords, bid for price per call, advertisement budge, payment information, etc. (not shown in FIG. 14), can also be specified using similar user interfaces. Further, similar user interfaces can be used to modify the corresponding information and update the advertisement.

In FIG. 14, the service area is specified is the section (405) for a phone number (419). In one embodiment, an advertiser can specify one phone number for one service area, or specify multiple phone numbers for one same service area, or specify different phone numbers for different service areas.

Further, in one embodiment, a service area may be specified as a combination of multiple areas, such as the union of a set of first areas (e.g., zip code area, cities, etc.) excluding the union of a set of second areas (e.g., a custom area defined on a map). For example, in one embodiment, an advertiser can define his own custom area through define a shape (e.g., polygon, circle, ellipse, closed curve, etc.) upon a map. For example, the advertiser may enter in the precise points of latitude and longitude, thereby defining the exact geography he would like to target his ads to, or through free-hand drawing a the shape on the map at a suitable magnification (e.g., street level, city level, state level, etc.). In one embodiment, a user interface (not shown in FIG. 14)

presents a map in which the advertiser can simply click upon points to define a polygon, within which the advertisement will be targeted.

For example, an entertainment lawyer can create an advertisement to be targeted for audiences in both New York City and Los Angeles. In one embodiment, the lawyer can do this by defining the areas using the above methods twice or multiple times, each time specifying one area. A user interface (not shown in FIG. 14) can then be used to show the list of areas that are specified separately. Alternatively, the lawyer can select both New York City and Los Angeles on a map.

FIG. 15 shows a diagram of connecting phone calls according to geographic areas of advertisers and callers according to one embodiment.

In FIG. 15, the advertisement (501) illustrates an appearance of the content as specified in the section (403) of FIG. 14 when it is presented in a media channel for advertisement. The advertisement (501) includes a phone number (503), which is assigned statically or dynamically to the advertiser (and the media channel when tracking the media channel is desired). Alternatively, the advertisement may contain a reference to the phone number through showing a call button (e.g., for VoIP online phone initiation) without showing the phone number. The database (511) indicates the association relation between the advertised phone number and the phone number of the advertiser (513 and 515).

Thus, after the advertisement delivery (505) according to the geographic area of interest, the user views the advertisement (501) and calls the advertised phone number (503) from the user's phone (507). The phone call is received at the phone decoder and router (517) at the advertised phone number through the telephone network (509). According to the database (511), the phone decoder and router (517) forwards the phone call to the advertiser. Through the telephone network (509), the phone call reaches the advertiser at the target phone (519), which has the phone number specified by the advertiser (e.g., in the phone field 419 in FIG. 14).

In one embodiment, the advertisement delivery (505) is at least partially based on the matching of geographic area of interest. For example, when the user is searching relevant advertisements in a geographic area that is within the service area of the advertiser, the advertisement becomes a candidate for an advertisement in the search result page. The user may search information through web, WAP, SMS, or other custom server/client applications. The geographic area of interest may be indicated in the search terms used, or in the preferences of the user, or specified in the categories of search.

Alternatively, the geographic area of interest may be inferred from the location of the user. For example, the user device may be a wireless mobile device. The location of the wireless mobile device can be determined using a number of ways.

For example, the user may specify the geographic area in the phone call through an automated system (e.g., entering a zip code using a touch tone phone) or through human concierges.

For example, the cellular position system, or a satellite/pseudolite position system, can be used to determine the location of a cellular phone to determine the location of a mobile device. For example, the location of the mobile device may be determined through a Global Positioning System (GPS) receiver that is connected to, or built within, the mobile device.

Pseudolites are ground-based transmitters similar to a Global Positioning System (GPS). Pseudolites are useful in situations where signals from an orbiting satellite might be unavailable, such as tunnels, mines, buildings or other enclosed areas. A satellite/pseudolite signal receiver may determine its location and transmit the location through the cellular phone to a cellular communication system, or transmit the received signals to a location server which computes the location.

A cellular communication system may also determine the location of a cellular phone. For example, the location of a cellular phone can be determined using a method known as Time Difference of Arrival (TDOA) in which the reception times of a cellular signal from a mobile station are measured at several base stations to determine the position of the cellular phone. Alternative, a method known as Advanced Forward Link Trilateration (AFLT), or Enhanced Observed Time Difference (EOTD), can be used, which measures the reception times of cellular signals from several base stations to the cellular phone.

Alternatively, the cellular site in which the mobile device can communicate to a based station can be used to determine a rough position of the cellular phone. In general, any method used by a cellular phone provider to get location information (e.g., for emergency service) can be used.

Further, the automatic number identification (ANI) service can be used to determine the phone number of the incoming call and look up the geographic area information from the database for the phone numbers.

Further, an access point for a wireless local area network or a wireless personal area network typically has a small coverage area. Based on the location of the access point, location information (e.g., the city, or more precise location information) can be obtained.

Further, for example, the user device may be a wired device accessing the Internet through an Internet Service Provider. The location information of the user device can be obtained automatically from the Internet Service Provider.

Alternatively, the location information can be obtained from user preference data.

In one embodiment, when the user searches for information without explicitly specifying a geographic area, the geographic area of interest can be determined based on typical geographic radius of interest on the topic and the location of the user.

In one embodiment, the advertisement (501) is not delivered if the geographic area of interest to the user does not match the service area of the advertiser. In one embodiment, the ranking of the advertisement candidates is partially based on the degree of matching between the geographic area of interest to the user and the service area of the advertiser. For example, when other conditions are the same (e.g., bid for call per price, matching between search content and service, etc.), the further the advertiser from the user the lower the rank of the corresponding advertisement.

In one embodiment, the location of the user device is determined automatically, which is then used to determine the location-dependent content information and advertisements.

For example, when the user performs a search for information which is location dependent, the location automatically determined for the mobile device is used with the search request. For example, when the user search for "hotels" without specifying a location using an SMS-based search, the city in which the mobile device is located is determined; and a pay-per-call list of hotels in the city is sent via SMS to the mobile device.

In one example, the user may search for "dentists" in a custom client application; and a custom server application provides a pay-per-call list of "dentists" close to the current position of the mobile device.

In one example, the user may search in a web page or a WAP page for a particular subject. The return results include one or more pay-per-call advertisements to be presented in a browser running in the mobile device.

In one embodiment, certain content information is automatically channeled into the mobile device when the mobile device enters into a wireless access zone. For example, when a wireless mobile device enters into a commercial district, pay-per-call lists of various nearby points of interest, such as hotels, movie theaters, restaurants, etc., can be automatically presented on the mobile device, according to user preferences. The information can be provided (e.g., in accordance with a user preference) without the user explicitly specifying a search.

In one embodiment, a user may search for particular types of experts, businesses, institutions, persons, etc. When the user is interested in calling one selected entity (e.g., an expert, a doctor, a restaurant), the user device can automatically dial the encoded phone number of the entity without the user manually dial the number; and the phone router/connecter decodes the information and connects the mobile device to the phone of the selected entity. Alternatively, the phone number of the mobile device may be determined (e.g., through ANI, or user input, or user preference setting); and the phone connector connects phone calls to both the mobile device and the phone of the selected entity to connect the user to the selected entity. In such a process, the identity of the mobile device may be kept anonymous from the selected entity; and the identity of the selected entity may also be kept anonymous from the user of the mobile device.

In one embodiment, the advertisement may also be presented in other types of media channels, such as newspaper, television/radio broadcast, etc. For example, the advertisement may be presented in a media channel that is typically for users in the target region.

In one embodiment, the phone number (503) is further associated with a particular media channel so that when the phone decoder and router (517) receives the phone call at the advertised phone number the identity of the media channel can also be determined and recorded.

In one embodiment, the geographic location of the user is determined from location of the calling device of the user. The geographic area of the advertiser is matched to the geographic location of the user at the phone decoder and router (e.g., 517 in FIG. 15). For example, the advertiser may have multiple phone numbers for multiple geographic areas, the geographic location of the user from where the call is initiated can be used to select the phone number for the corresponding geographic area.

Figure 16:
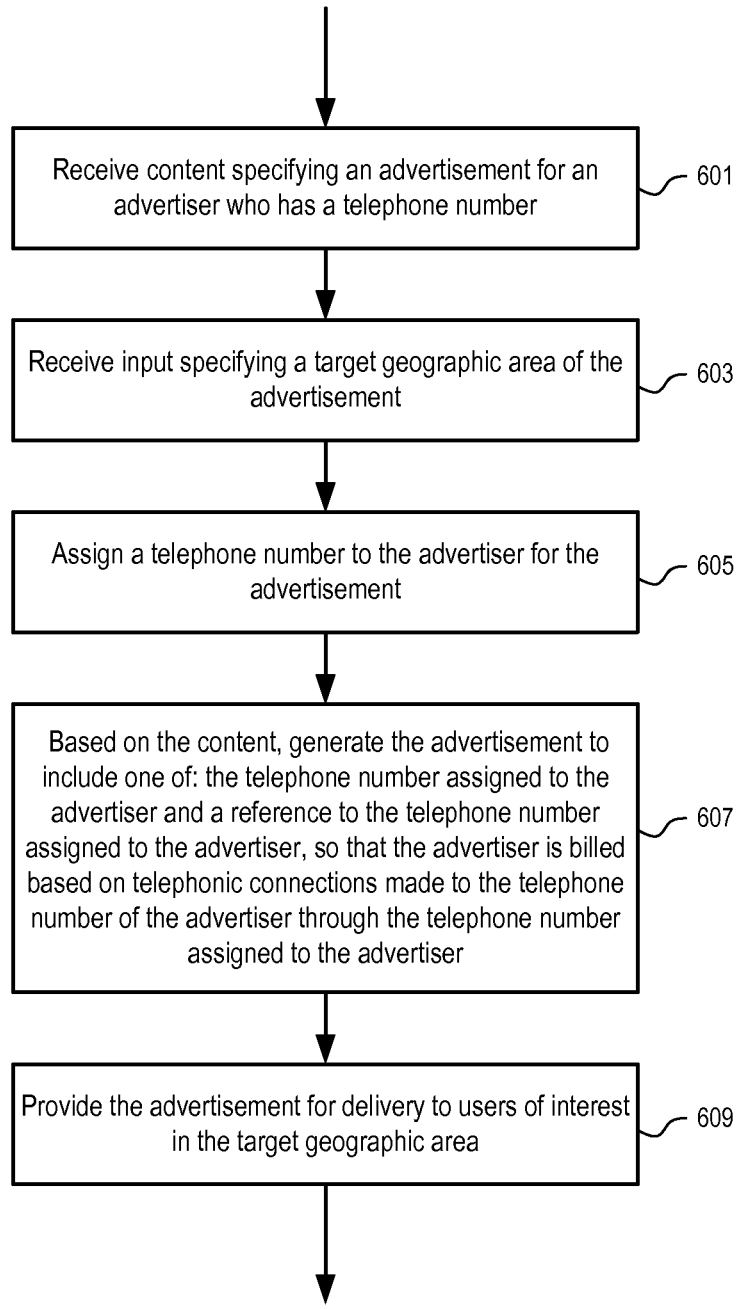
FIGS. 16-17 show flow diagrams of generating advertisements, making and tracking phone connections according to some embodiments.
Figure 17:
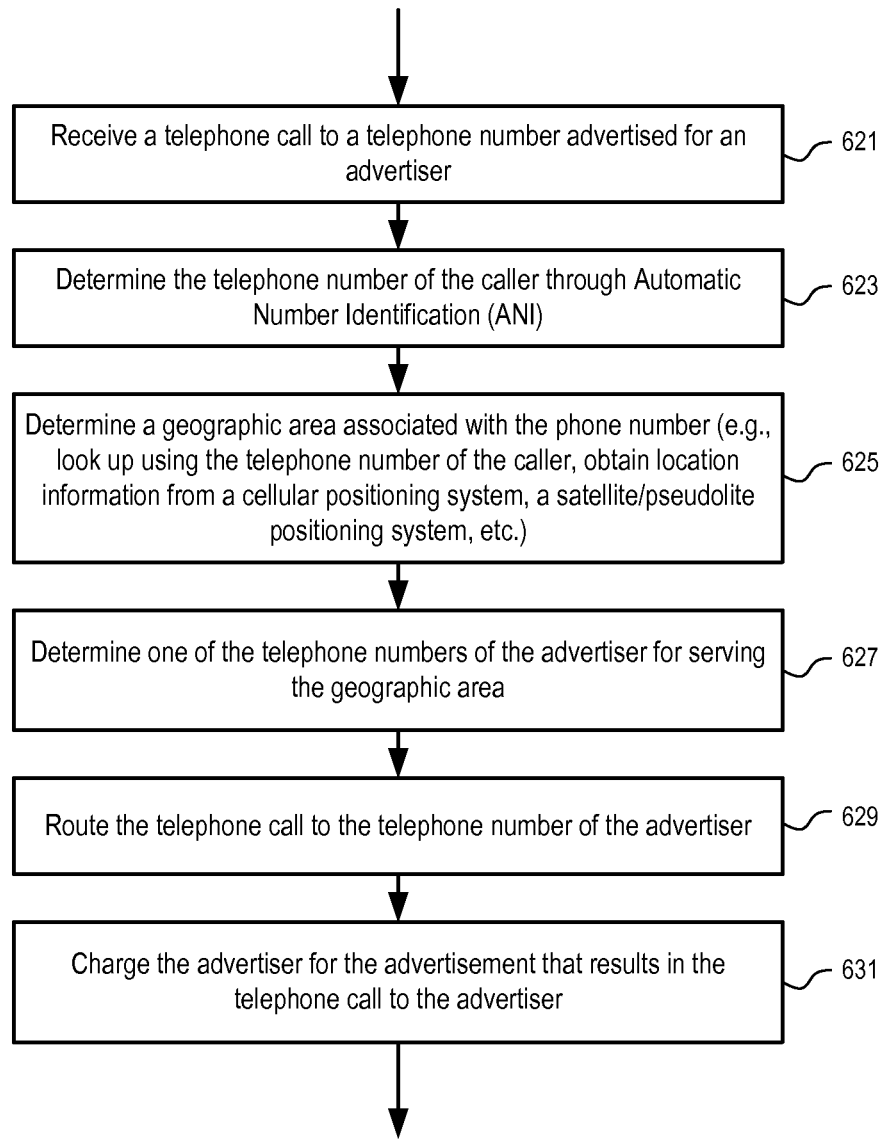

FIGS. 16-17 show flow diagrams of generating advertisements, making and tracking phone connections according to embodiments.

In FIG. 16, operation 601 receives content specifying an advertisement for an advertiser who has a telephone number. Operation 603 receives input specifying a target geographic area of the advertisement.

Operation 605 assigns a telephone number to the advertiser for the advertisement. The telephone number assigned to the advertiser is an encoded version of the telephone number of the advertiser so that a potential customer cannot call the telephone number of the advertiser directly. In one embodiment, the telephone number assigned to the advertiser is further associated with a media channel that is responsible for delivering the advertisement so that the identity of the media channels creditable for delivering the advertisement to the callers can be tracked and recorded.

Based on the content, operation 607 generates the advertisement to include one of: the telephone number assigned to the advertiser and a reference to the telephone number assigned to the advertiser, so that the advertiser is billed based on telephonic connections made to the telephone number of the advertiser through the telephone number assigned to the advertiser. In one embodiment, the advertisement is generated through replacing the telephone number of the advertiser with the telephone number assigned to the advertiser.

Operation 609 provides the advertisement for delivery to users of interest in the target geographic area. In one embodiment, the advertisement is generate for distribution by a specify media channel, such as a specify search engine, a web/WAP site, a content provider, etc.

In one embodiment, the selection of a location of the advertiser and the corresponding target phone number is made at the time a phone call is received at a switch/router; and the selection may be automatic based on ANI or location information determined from a positioning system, or semi-automatic based on user interaction with an automated IVR, or non-automatic based on the user interaction with a human concierge.

In FIG. 17, operation 621 receives a telephone call to a telephone number advertised for an advertiser. Operation 623 determines the telephone number of the caller through Automatic Number Identification (ANI).

Operation 625 determines a geographic area associated with the phone number (e.g., look up using the telephone number of the caller, obtain location information from a cellular positioning system, a satellite/pseudolite positioning system, etc.). Operation 627 determines one of the telephone numbers of the advertiser for serving the geographic area.

Operation 629 routes the telephone call to the telephone number of the advertiser. Operation 631 charges the advertiser for the advertisement that results in the telephone call to the advertiser.

Figure 18:
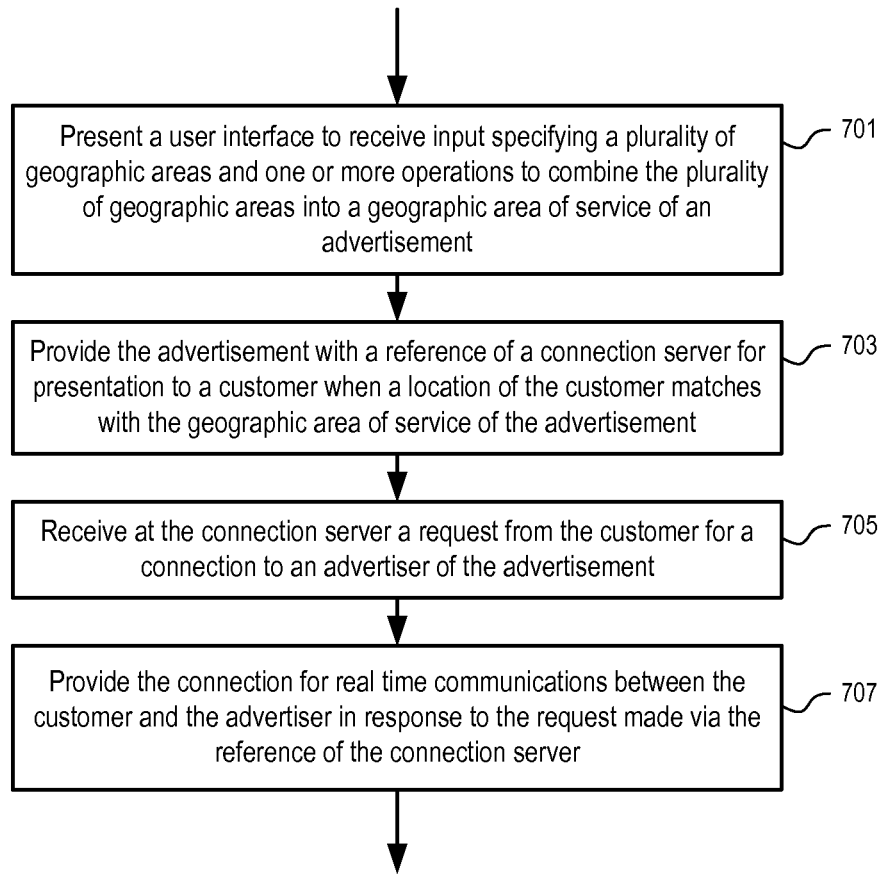
FIG. 18 shows a method to specify a geographic area for connecting a customer to an advertiser via an advertisement according to one embodiment.

FIG. 18 shows a method to specify a geographic area for connecting a customer to an advertiser via an advertisement according to one embodiment. In FIG. 18, a user interface is presented (701) to receive input specifying a plurality of geographic areas and one or more operations to combine the plurality of geographic areas into a geographic area of service of an advertisement. In one embodiment, each of the plurality of geographic areas has a portion that is not in the geographic area of service of the advertisement.

In one embodiment, the one or more operations include an operation based on determining an overlapping area between a first geographic area and a second geographic area of the plurality of geographic areas; and wherein the first and second geographic areas partially overlapping with each other. The overlapping area may or may not be part of the geographic area of service of the advertisement.

For example, the first geographic area is a city, a metropolitan area, a county, a state, or a country; and the second geographic area is determined by a specified distant to a center, such as the center of a postal code, a street address, or a point on a map.

In one embodiment, the one or more operations include an operation based on excluding a portion of a first geographic area according to a second geographic area of the plurality of geographic areas; and the first and second geographic areas partially overlap with each other. The first geographic area is not entirely within the second geographic area; and the second geographic area is not entirely within the first geographic area.

In FIG. 18, the advertisement is provided (703) with a reference of a connection server for presentation to a customer when a location of the customer matches with the geographic area of service of the advertisement. For example, the reference of the connection server may be a Session Initiation Protocol (SIP) Uniform Resource Identifier (URI), a telephone number without an extension, a telephone number with an extension, a Voice over Internet Protocol (VoIP) user identifier, an instant messaging user identifier, or a link to a server to the connection server for a telephonic callback.

In FIG. 18, a request is received (705) at the connection server from the customer for a connection to an advertiser of the advertisement. The connection for real time communications between the customer and the advertiser is provided (707) in response to the request made via the reference of the connection server.

In one embodiment, the advertiser is charged an advertisement fee per the provided connection. In one embodiment, the provided connection comprises a telephonic connection for a telephone conversation between the customer and the advertiser. In other embodiments, the advertiser is charged an advertisement fee per lead to a customer. A lead to the customer may be an email lead to the customer, a text chat connection to the customer, an instant messaging connection with a customer, a short text message lead to the customer, etc.

In one embodiment, the connection server establishes a first Voice over Internet Protocol (VoIP) connection to connect to the customer, establishes a second Voice over Internet Protocol (VoIP) connection to connect to the advertiser, and causes the first and second VoIP connections to be bridged to connect the customer and the advertiser. In one embodiment, to bridge first and second VoIP connections a media connection that does not go through the connection server is established to connect the customer and the advertiser.

In one embodiment, the location of the customer is determined from a search request submitted from the customer. The location may be based on a preference of the customer, a location of a user terminal used by the customer to submit the search request, or be specified by the customer as part of a search criterion of the search request.

In one embodiment, a user interface is provided to the customer to receive input specifying a plurality of geographic areas and one or more operations to combine the plurality of geographic areas into a geographic area of interest; and a search of advertisements is performed based on the geographic area of interest.

In one embodiment, a location of the customer is determined when the request is received at the connection server via the reference of the connection server; and the connection is provided in response to a determination that the determined location of the customer is within the geographic area of service of the advertisement. The location of the customer may be determined based on an interactive voice response system which prompts the customer to identify the location of the customer, be determined based on a wireless communication access point, be determined based on the position of one or more cellular base stations, etc.

From this description, it will be appreciated that certain aspects are embodied in the user devices, certain aspects are embodied in the server systems, and certain aspects are embodied in a system as a whole. Embodiments disclosed can be implemented using hardware, programs of instruction, or combinations of hardware and programs of instructions.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects disclosed may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

What is claimed is:

1. A system comprising:
a server system comprising a plurality of servers configured to detect a location of an end-user device;
the server system comprising the plurality of servers, including a web server and a connection server, the web server configured to process a first transmission received by the web server from the end-user device, to facilitate user-selectable options of a user interface presented with an application of the end-user device, the user-selectable options presented for display via the user interface of a display device of the end-user device to prompt input specifying a plurality of geographic areas with different types of geographic limitations, the server system to, based at least in part on the processing of the first transmission, identify a first definition of a first geographic area and a second definition of a second geographic area and perform at least one operation to combine at least the first and the second geographic areas to form an overlapping geographic area used to define a geographic area of service of an advertisement, the different types of geographic limitations comprising a first type of one or more limitations and a second type of one or more limitations, wherein:
the first type of one or more limitations is different from the second type of one or more limitations;
the first geographic area is specified according to the first type of one or more limitations; and
the second geographic area is specified according to the second type of one or more limitations;
the server system comprising a database to store the advertisement in association with one or more specification of the geographic area of service, the server system to generate a first advertisement that (a) identifies a determined location of an advertiser in a detected geographic region of the detected location of the first end-user device and (b) provides, via the web server, visible indicia of the first advertisement, comprising a telephonic reference of the connection server assigned to the first advertisement, to the user interface of the display device of the end-user device of a customer, for user interaction with the visible indicia by the customer, in response to determining a location associated with the customer matches the geographic area of service of the advertisement;
the server system to process a second transmission received from the end-user device associated with the customer, the second transmission made based in part on detection of a selection, via the user interface of the end-user device, of the telephonic reference of the connection server and corresponding to a request for real time communications with the advertiser associated with the first advertisement;

establishing a real time communication session, via the connection server, by routing a telephone call, via a Voice over Internet Protocol using a Session Initiation Protocol connection via a session border controller device of the connection server, between the end-user device associated with the customer and another end-user device associated with the advertiser in response to (i) the request made and (ii) detecting the selection of the telephonic reference, via the user interface from the visible indicia, of the connection server;
wherein the first geographic area and the second geographic area at least partially overlap with each other, and at least one of the first geographic area and the second geographic area is not completely overlapping of an other of the first geographic area and the second geographic area; and
detecting a selection, via the user interface, of the geographic area of service of the advertisement from one of the overlapping area and/or a geographic area of at least the first geographic area and the second geographic area outside of the overlapping area denoted in an electronic interactive digital map displayed via the display device.

2. A method comprising:
detecting, via a server system, a location of an end-user device;
processing by a web server of the server system a first transmission, received by the web server from the end-user device, to facilitate user-selectable options of a user interface presented with an application of the end-user device, the user-selectable options presented for display via the user interface of a display device of the end-user device to prompt input specifying a plurality of geographic areas with different types of geographic limitations, the different types of geographic limitations comprising a first type of one or more limitations and a second type of one or more limitations, wherein the first type of one or more limitations is different from the second type of one or more limitations;
based at least in part on the processing of the first transmission, identifying, by the server system, a first definition of a first geographic area and a second definition of a second geographic area and performing at least one operation to combine at least the first and the second geographic areas to form an overlapping geographic area used to define a geographic area of service of an advertisement, wherein:
the first geographic area is specified according to the first type of one or more limitations; and
the second geographic area is specified according to the second type of one or more limitations;
storing by the server system the advertisement in association with one or more specifications of the geographic area of service in a database of the server system;
generating by the server system a first advertisement that (a) identifies a determined location of an advertiser in a detected geographic region of the detected location of the end-user device and (b) provides, by the web server, visible indicia of the first advertisement, comprising a telephonic reference of a connection server of the server system assigned to the first advertisement, to the user interface of the display device of the end-user device of a customer, for user interaction with the visible indicia by the customer, in response to determining a location associated with the customer matches the geographic area of service of the first advertisement;

processing by the server system a second transmission received from the end-user device associated with the customer, the second transmission made based in part on detection of a selection, via the user interface of the end-user device, of the telephonic reference of the connection server and corresponding to a request for real time communications with the advertiser associated with the first advertisement;

establishing a real time communication session, via the connection server, by routing a telephone call, via a Voice over Internet Protocol using a Session Initiation Protocol connection via a session border controller device of the connection server, between the end-user device associated with the customer and another end-user device associated with the advertiser in response to (i) the request made and (ii) detecting the selection of the telephonic reference, via the user interface from the visible indicia, of the connection server;

wherein the first geographic area and the second geographic area at least partially overlap with each other and at least one of the first geographic area and the second geographic area is not completely overlapping of an other of the first geographic area and the second geographic area; and detecting a selection, via the user interface, of the geographic area of service of the advertisement from one of the overlapping area and/or a geographic area of at least the first geographic area and the second geographic area outside of the overlapping area denoted in an electronic interactive digital map displayed via the display device.

3. The method of claim 2, wherein each of the plurality of geographic areas has a portion that is not in the geographic area of service of the advertisement.

4. The method of claim 2, wherein the first geographic area is at least one of a city, a metropolitan area, a county, a state, and a country; and the second geographic area is determined by a specified distance to a center.

5. The method of claim 4, wherein the center is specified by at least one of a postal code, a street address, and a point on a map.

6. The method of claim 2, further comprising:
charging the advertiser an advertisement fee per the provided connection.

7. The method of claim 6, wherein the provided connection comprises a telephonic connection for a telephone conversation between the customer and the advertiser; and the reference of the connection server comprises one or more of a session initiation protocol uniform resource identifier, a telephone number without an extension, a telephone number with an extension, a voice over Internet protocol user identifier, an instant messaging user identifier, and/or a link to a server to the connection server for a telephonic callback.

8. The method of claim 2, wherein the at least one operation includes an operation based on excluding a portion of a first geographic area according to a second geographic area of the plurality of geographic areas; and wherein the first and second geographic areas partially overlap with each other.

9. The method of claim 2, wherein providing the connection for real time communications between the customer and the advertiser comprises:

the connection server establishing a first voice over Internet protocol connection to connect to the customer;

the connection server establishing a second voice over Internet protocol connection to connect to the advertiser; and bridging the first and second voice over Internet protocol connections to connect the customer and the advertiser.

10. The method of claim 9, wherein bridging the first and second voice over Internet protocol connections comprises establishing a media connection that does not go through the connection server to connect the customer and the advertiser.

11. The method of claim 2, further comprising: determining the location of the customer from a search request submitted from the customer.

12. The method of claim 11, wherein the location is based on a preference of the customer.

13. The method of claim 12, wherein the location is based on a location of the end-user device used by the customer to submit the search request.

14. The method of claim 13, wherein the location is specified by the customer as part of a search criterion of the search request.

15. The method of claim 14, further comprising:
presenting, via the web server, a user interface to the customer configured to receive input specifying a plurality of geographic areas and to perform at least one operation to form the overlapping geographic area used to form a geographic area of interest; and performing, via the connection server, a search of advertisements based on the geographic area of interest.

16. The method of claim 2, further comprising:
determining a determined location of the customer when the request is received at the connection server via the reference of the connection server;

wherein the connection is provided in response to a determination that the determined location of the customer is within the geographic area of service of the advertisement.

17. One or more non-transitory, computer-readable media storing instructions, the instructions, when executed by a server system, causing the server system to:

detect, via the server system, a location of an end-user device;

process by a web server of the server system a first transmission, received by the web server from the end-user device, to facilitate user-selectable options of a user interface presented with an application of the end-user device, the user-selectable options presented for display via the user interface of a display device of the end-user device to prompt input specifying a plurality of geographic areas with different types of geographic limitations, the different types of geographic limitations comprising a first type of one or more limitations and a second type of one or more limitations, wherein the first type of one or more limitations is different from the second type of one or more limitations;

based at least in part on the processing of the first transmission, identify a first definition of a first geographic area and a second definition of a second geographic area and perform at least one operation to combine at least the first and the second geographic areas to form an overlapping geographic area used to define a geographic area of service of an advertisement, wherein:

the first geographic area is specified according to the first type of one or more limitations; and the second geographic area is specified according to the second type of one or more limitations;

store the advertisement in association with one or more specifications of the geographic area of service in a data store of the server system;

generate a first advertisement that (a) identifies a determined location of an advertiser in a detected geographic area of the detected location of the end-user device and (b) provides visible indicia of the first advertisement, comprising a telephonic reference of a connection server of the server system assigned to the first advertisement, to the user interface of the display device of the end-user device of a customer, for user interaction with the visible indicia by the customer, in response to determining a location associated with the customer matches the geographic area of service of the first advertisement;

process a second transmission received from the end-user device associated with the customer, the second transmission made based in part on detection of a selection, via the user interface of the end-user device, of the telephonic reference of the connection server and corresponding to a request for real time communications with the advertiser associated with the first advertisement;

establish a real time communication session, via the connection server, by routing a telephone call, via a Voice over Internet Protocol using a Session Initiation Protocol connection via a session border controller device of the connection server, between the end-user device associated with the customer and another end-user device associated with the advertiser in response to (i) the request made and (ii) detecting the selection of the telephonic reference, via the user interface from the visible indicia, of the connection server;

wherein the first geographic area and the second geographic area at least partially overlap with each other and at least one of the first geographic area and the second geographic area is not completely overlapping of an other of the first geographic area and the second geographic area; and detect a selection, via the user interface, of the geographic area of service of the advertisement from one of the overlapping area and/or a geographic area of at least the first geographic area and the second geographic area outside of the overlapping area denoted in an electronic interactive digital map displayed via the display device.

* * * * *